US012118296B2

(12) United States Patent
Wilde et al.

(10) Patent No.: US 12,118,296 B2
(45) Date of Patent: Oct. 15, 2024

(54) COLLABORATIVE COAUTHORING WITH ARTIFICIAL INTELLIGENCE

(71) Applicant: Microsoft Technology Licensing, LLC, Redmond, WA (US)

(72) Inventors: Benjamin Gustav Wilde, Quincy, MA (US); Ransom Lloyd Richardson, Acton, MA (US); Jenna Hong, Acton, MA (US); Theo Lorrain-Hale, Boston, MA (US); Christina Rose Long, Cambridge, MA (US); Omar Basim Tuffaha, Saugus, MA (US); Yang Wang, Middleton, MA (US); Paul Anthony Scudieri, Columbus, OH (US); Susanne Duswald, Vancouver (CA); Ryan Michael Lawrence, Redmond, WA (US); Michael Adam Scarpati, Wellesley, MA (US); Courtney Sarah Cochrane, Cambridge, MA (US); Alexey Romanov, Cambridge, MA (US); Katie Nicole Rotella, Highland Park, NJ (US); Moiz Shabbir Ghadiyali, Cypress, TX (US); Emili Koui-Miclette, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/309,338

(22) Filed: Apr. 28, 2023

(65) Prior Publication Data

US 2024/0303415 A1 Sep. 12, 2024

Related U.S. Application Data

(60) Provisional application No. 63/489,298, filed on Mar. 9, 2023.

(51) Int. Cl.
*G06F 40/166* (2020.01)
*G06F 16/176* (2019.01)
(Continued)

(52) U.S. Cl.
CPC .......... *G06F 40/166* (2020.01); *G06F 16/176* (2019.01); *G06F 40/56* (2020.01); *H04L 65/4015* (2013.01)

(58) Field of Classification Search
CPC ... G06F 40/166; G06F 16/176; H04L 65/4015
See application file for complete search history.

(56) References Cited

U.S. PATENT DOCUMENTS 11,715,042 B1* 8/2023 Liu .................. G06N 3/006
705/26.1
11,810,337 B2* 11/2023 Wu .................. A61B 5/165
(Continued)

OTHER PUBLICATIONS

Lee, Mina, et al., CoAuthor: Designing a Human-AI Collaborative Writing Dataset for Exploring Language Model Capabilities, published Jan. 25, 2022 and available at https://arxiv.org/abs/2201.06796 (Year: 2022).*

(Continued)

*Primary Examiner* — Keith D Bloomquist
(74) *Attorney, Agent, or Firm* — NovoTechIP International PLLC

(57) ABSTRACT

A data processing system implements receiving a first textual prompt from a first user via a first user interface of a first client device, the first textual prompt includes a textual description of content to be generated by a generative model; providing the first textual prompt as a first input to the generative model to obtain as an output first collaborative content based on the first textual prompt; receiving an edited version of the first collaborative content from the first client device that includes edits to the first collaborative content provided by the first user; providing the edited
(Continued)

version of the first collaborative content as a second input to the generative model to obtain as an output second collaborative content based on the edited version of the first collaborative content; and causing the first client device to present the second collaborative content on the first user interface.

20 Claims, 25 Drawing Sheets

(51) Int. Cl.
*G06F 40/56* (2020.01)
*H04L 65/401* (2022.01)

(56) References Cited

U.S. PATENT DOCUMENTS

| | | | | |
|---|---|---|---|---|
| 2006/0136513 | A1* | 6/2006 | Ngo | G06Q 10/10 707/999.203 |
| 2009/0157811 | A1* | 6/2009 | Bailor | G06F 40/166 709/204 |
| 2021/0272341 | A1* | 9/2021 | Swaminathan | G06T 7/70 |
| 2021/0377310 | A1* | 12/2021 | Fernando | H04L 63/0236 |
| 2022/0229832 | A1* | 7/2022 | Li | G06F 16/243 |
| 2022/0280088 | A1* | 9/2022 | Wu | G06V 10/454 |
| 2022/0366153 | A1* | 11/2022 | Li | G06F 16/24578 |
| 2023/0153546 | A1* | 5/2023 | Peleg | G06F 40/166 704/9 |
| 2024/0104275 | A1* | 3/2024 | Liu | G06F 30/27 |

OTHER PUBLICATIONS

Saboo, Shubham and Kublik, Sandra, A Beginners Guide to GPT-3, published May 2022 and available at https://www.datacamp.com/blog/a-beginners-guide-to-gpt-3 (Year: 2022).*

"Application as Filed in U.S. Appl. No. 18/184,267", Filed date: Mar. 15, 2023, 32 Pages.

* cited by examiner

Create New Workspace

Content will be automatically suggested based on the title of the workspace. However, you can help improve these suggestions by providing additional details about the workspace below. You can enter keywords, a description of the workspace, or both.

Once you have entered the additional details, click on "Create Workspace" below to start the search for content.

If you do not wish to add content later, you may skip adding additional detail below and instead click on "Create Workspace" below.

A workspace for helping the development team to code the new features described in the functional specifications for Project X.

— 142

144 — Create Workspace   146 — Back

140

All Suggestions — 154

152

R&D Calendar | Demo Code | Marketing Materials

Meeting Notes | White Paper | Project Map

Prototype Demo | X 1.0 Functional Requirements | XC - Functional Requirements

Project X Workspace

Project collateral:

X 1.0 Functional Requirements ⎫
XC – Functional Requirements ⎬ — 164
Project Map                    ⎪
Demo Code                      ⎭

Marketing Materials

Introducing the Future of Investing: An AI-Driven Investment Application

Our new AI-driven investment application is designed to revolutionize the way you invest. With our cutting-edge technology and advanced algorithms, you can make better investment decisions and maximize your returns. Here are some of the key features and benefits of our application:

Advanced An[alytics] — 205

Coauthoring Tool
This tool can help you create content based on this document. To get started, enter text in the text field below or click on a starting prompt.

[Summary] [List] [Picture It] [Tell Me] — 210

Enter your text here — 220

Our AI-driv[e] real-time. T portfolio. W curve.

Intuitive Us[e]
Our user int or expertise

Personalize
Our AI-driv[e] your unique that are alig[ned]

Real-Time A[lerts]
Our applica[tion] information and make tim[ely]

24/7 Customer Support
Our customer support team is available 24/7 to answer any questions you may have about our application. We're always here to help you make the most of your investments.

In conclusion, our AI-driven investment application is the future of investing. With advanced analytics, personalized investment recommendations, and real-time alerts, you can make better investment decisions and maximize your returns. So why wait? Download our app today and start investing like a pro!

— 166

155 — Update Workspace

COLLABORATIVE COAUTHORING WITH ARTIFICIAL INTELLIGENCE

BACKGROUND

Collaboration platforms provide tools that enable multiple users to collaborate with one another in a cohesive manner to create, prepare, review, and/or format various types of electronic content. This electronic content, also referred to herein as "project collateral," may include but are not limited to word processing documents, spreadsheets, presentations, images, drawings, videos, web pages, program code, executable applications, and/or documents or components generated by other types of software applications. Some collaboration platforms utilize large language models (LLMs) to generate textual content. However, current LLMs generate static content in response to an initial prompt and prompt refiners. The static text can be changed by issuing additional prompt refiners to the LLM, but the textual content is generated by the LLM in typically read-only format. Hence, there is a need for improved systems and methods that provide a technical solution for improving the user experience when generating content using AI.

SUMMARY

An example data processing system according to the disclosure includes a processor and a machine-readable medium storing executable instructions. The instructions when executed cause the processor to perform operations including receiving a first textual prompt from a first user via a first user interface of a first client device, the first textual prompt comprising a textual description of content to be generated by a first generative model; providing the first textual prompt as a first input to the first generative model to obtain as an output first collaborative content based on the first textual prompt received from the first user; receiving an edited version of the first collaborative content from the first client device, the edited version of the first collaborative content includes edits to the first collaborative content provided by the first user; providing the edited version of the first collaborative content as a second input to the first generative model to obtain as an output second collaborative content based on the edited version of the first collaborative content; and causing the first client device to present the second collaborative content on the first user interface.

An example data processing system according to the disclosure may include a processor and a machine-readable medium storing executable instructions. The instructions when executed cause the processor to perform operations including receiving a first textual prompt from a first user and an indication of a selection of a predetermined prompt from among a plurality of predetermined prompts via a first user interface of a first client device, the first textual prompt comprising a textual description of content to be generated by a first generative model, and the predetermined prompt providing a format of the content to be generated by the first generative model; providing the first textual prompt and the predetermined prompt as a first input to the first generative model to obtain as an output first collaborative content based on the first textual prompt and the predetermined prompt; receiving an edited version of the first collaborative content from the first client device, the edited version of the first collaborative content includes edits to the first collaborative content provided by the first user; providing the edited version of the first collaborative content as a second input to the first generative model to obtain as an output second collaborative content based on the edited version of the first collaborative content; and causing the first client device to present the second collaborative content on the first user interface.

An example method implemented in a data processing system for providing suggestions for improving textual content includes receiving a first textual prompt from a first user via a first user interface of a first client device, the first textual prompt comprising a textual description of content to be generated by a first generative model; providing the first textual prompt as a first input to the first generative model to obtain as an output first collaborative content based on the first textual prompt received from the first user; receiving an edited version of the first collaborative content from the first client device, the edited version of the first collaborative content includes edits to the first collaborative content provided by the first user; providing the edited version of the first collaborative content as a second input to the first generative model to obtain as an output second collaborative content based on the edited version of the first collaborative content; and causing the first client device to present the second collaborative content on the first user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1A-1D, 2A-2G, and 3A-3G are diagrams showing example user interfaces of an implementation of a collaboration platform.

DETAILED DESCRIPTION

Figure 1A:
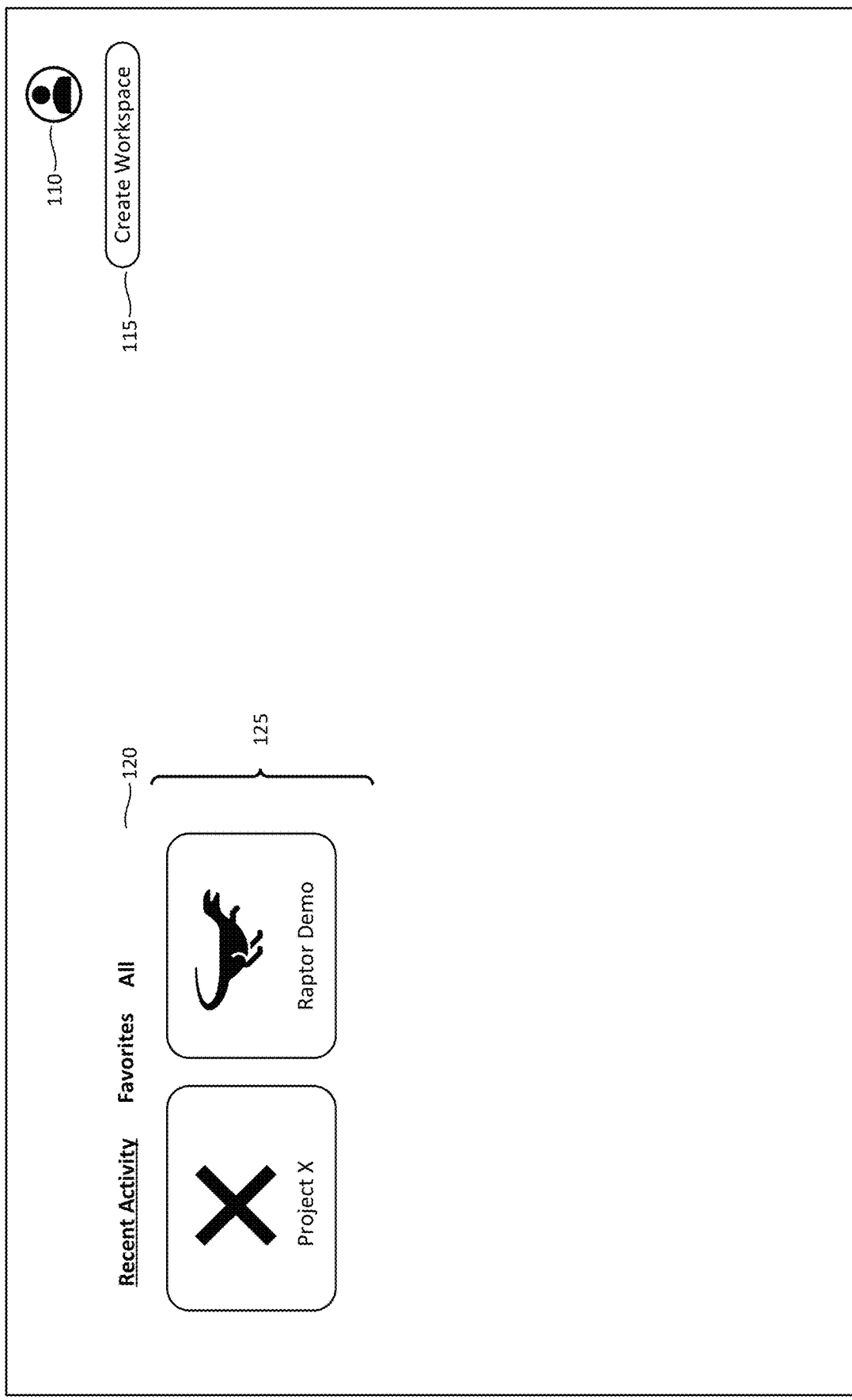

Systems and methods for providing collaborative coauthoring with AI are described herein. These techniques address the technical problems associated with current approaches to generating content using AI, which generates static content that does not truly provide users with an opportunity to actively coauthor content with the AI and/or other users. The techniques herein provide human collaborators with the ability to directly edit content generated by a generative model, such as but not limited to the Generative Pre-trained Transformer 3 (GPT-3) or GPT-4. The generated content can include textual content. The textual content includes formatted textual content in some implementations, such as but not limited to lists and tables. In some implementations, generated content includes other types of content, such as but not limited to diagrams, that may be edited by a human user before being sent back to the generative model for further refinement.

The edited content is provided as an input to the generative model and provided to the LLM for additional refinement. The human-provided edits are incorporated in the response generated by the generative model. This approach provides a means for human collaborators to directly collaborate with the AI to author content. A technical benefit of this approach is that the user edits the content generated by the AI directly rather than attempting to refine the content generated by the AI by refining a prompt to the AI to generate the desired content. Thus, these techniques provides a more natural approach to content generation using AI, because the user can edit the AI content in much the same way that the users would edit such content when collaborating with human users. Consequently, the user workflow is improved as well as the user experience. These and other technical benefits of the techniques disclosed herein will be evident from the discussion of the example implementations that follow.

FIGS. 1A-1D, 2A-2G, and 3A-3G are diagrams showing example user interfaces of an implementation of a collaboration platform. The collaboration platform enables users to collaborate with one another in a cohesive manner to create, prepare, review, and/or format various types of electronic content. The collaboration platform enables the user to organize electronic content into project-specific workspaces. A workspace can be associated with electronic content referred to as project collateral. The workspace may be a private workspace associated with a single user or a collaborative workspace associated with multiple users. Users may be associated with different access levels or roles that permit the user to perform certain actions associated with the workspace and/or the project collateral, such as but not limited to creating new project collateral, adding existing project collateral to the workspace, accessing existing project collateral, inviting users to collaborate on the workspace, and/or disassociating users with the workspace. The user interfaces shown in FIGS. 1A-1D, 2A, 2B, and 3A-3G are implemented by a native application on a client device of a user in some implementations and by a web application implemented by the collaboration platform in other implementations. Examples of such a client device and collaboration platform are shown in FIGS. 4 and 5. Some implementations implement the collaboration platform using Microsoft Loop®. Other implementations are implemented using other collaboration platforms.

FIG. 1A is a diagram of an example user interface 105 of an example collaboration platform. The user interface 105 includes workspace representations 125 that each represent a workspace to which the user has access. The user may have created the workspace or may have been invited to collaborate on a project by another user. The user profile icon 110 provides a control, which when clicked on or otherwise activated, causes user information for the user to be presented. The activation of the user profile 110 causes a user profile interface to be presented that provides the user with the ability to configure user profile information, such as but not limited to the first and/or last names of the user, the username of the user in the system, an image or icon used to represent the user on the collaboration platform, user authentication credentials, and/or other such information. The user interface 105 also includes a create workspace option 115, which when activated, causes a user interface for creating a new workspace to be presented to the user. The user interface guides the user through the creation of the new workspace. The selection tabs 120 allow the user to select which workspace representations 125 are presented to the user and/or the order in which the workspace representations 125 are presented. For example, clicking on or otherwise selecting the "Recent Activity" tab caused the collaboration platform to present the workspace representations 125 in an order based on how recently the user has accessed the workspaces. Those workspaces that have been more recently accessed are presented toward the top of the user interface 105 so that the user can quickly identify and return to working with a particular workspace that they recently accessed. Clicking on or otherwise activating the "Favorites" tab causes a set of workspaces specified by the user to be displayed, and clicking on or otherwise activating the "All" tab cases all the workspaces to which the user has access to be displayed.

Figure 1B:
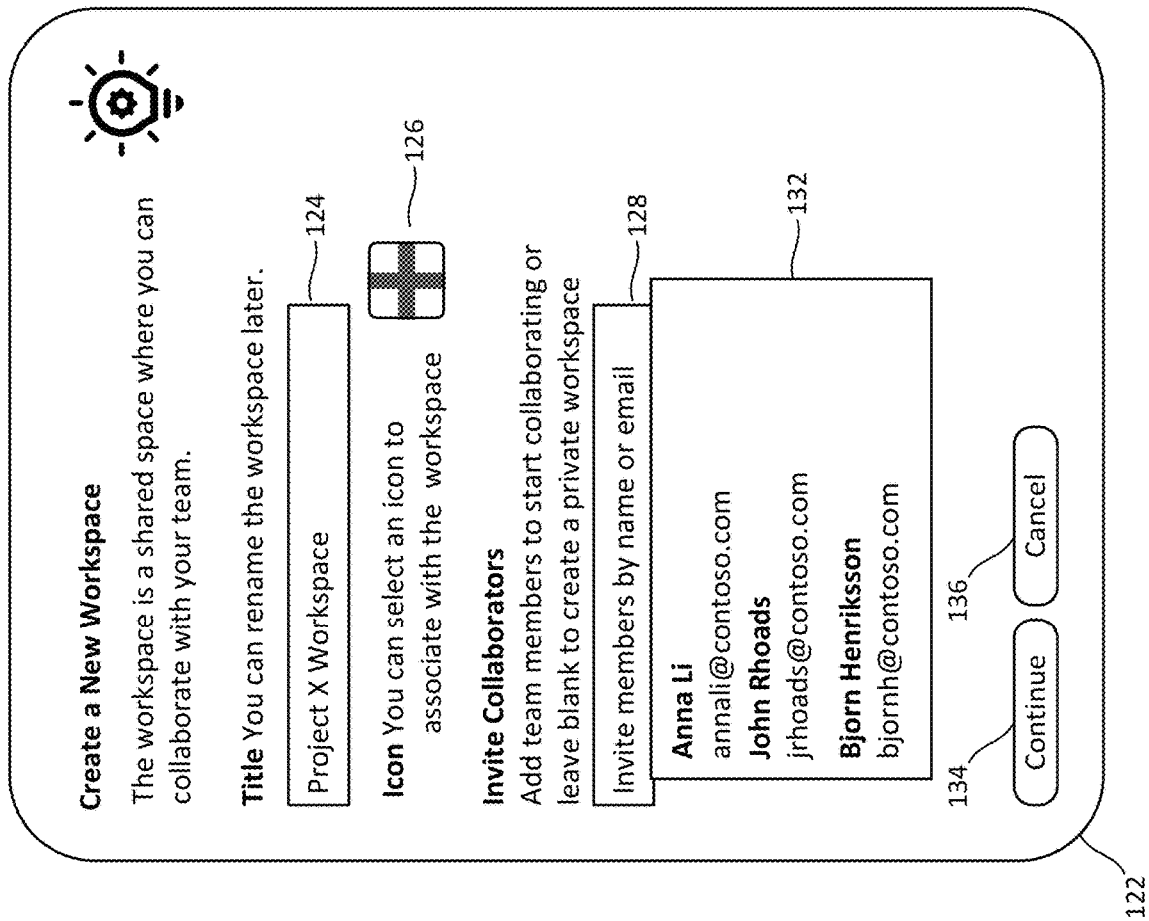

FIG. 1B shows an example user interface 122 that guides the user through the creation of the new workspace in response to the user clicking on or otherwise activating the create workspace option 115 of the user interface 105. The user interface includes a title field 124 which allows the user to associate a title with the workspace. The title is presented on the workspace representation 125 for the workspace to enable users to quickly identify the workspace from among the workspaces available to the user. The user may also select an icon to be associated with the workspace representation 125 by clicking on or otherwise activating the add icon control 126. Clicking on or otherwise activating the add icon control 126 causes the collaboration platform to present a file selection interface that allows the user to select an image file to use as the icon. In some implementations, clicking on or otherwise activating the add icon control 126 causes the collaboration platform to present an emoji picker that allows the user to select an emoji to be associated with the workspace.

The user interface 122 also includes an invite collaborators field 128. The user can use the invite collaborators field 128 to invite one or more other users to collaborate on the project associated with workspace being created. The user skips this step for private workspaces that have access limited to the user who created the workspace. In some implementations, a private workspace can later be converted to a collaborative workspace or vice versa. For conversions from a collaborative workspace to a private workspace, the users who have been invited to collaborate on the project associated with the workspace will no longer be able to access the now private workspace.

In some implementations, clicking on, typing in, or otherwise activating the invite collaborators field 128 causes the collaborative platform to present a list of potential collaborators 132 as shown in FIG. 1B. The user may click on or otherwise select one or more of these suggestions to be added to be invited to collaborate on the workspace. In some implementations, the list of potential collaborators 132 is populated based on contextual information and/or based on text input by the user. The title associated with the workspace is contextual information considered by the collaboration platform in some implementations. The title associated is analyzed by an NLP model train to identify keywords in the title that are used to identify potential collaborators that may be relevant based on the keywords. In a non-limiting example, the user creating the workspace is part of an enterprise or other organization that provides a directory of people associated with the organization and related user information, such as calendar information, information indicating the role of these people within the enterprise or organization, and/or other information indicative of the person's relationship with others within the enterprise or organization. In some implementations, the potential collaborators include people with whom the user has recently collaborated on other projects and/or with whom the user has communicated via email, text messages, and/or participated in a meeting via the collaboration platform. In some implementations, the potential collaborators include people who are in the same team or within the same group, division, or other portion of the organization structure as the user. Other implementations may include these or other signal sources for identifying potential collaborators who may be invited to participate in the workspace.

The list of potential collaborators 132 may be ordered by the collaboration platform based on the predicted relevance of the potential collaborators to the user. In a non-limiting example, potential collaborators 132 associated with a particular project team, division, or other role are predicted to be more relevant and are placed at the top of the list of potential collaborators 132. The collaborative platform sends an email and/or other type of message to the user notifying the invited collaborators that they have been invited to collaborate on the workspace. This notification includes instructions and/or controls for the user to accept the invitation.

The user may click on or otherwise activate the continue option 134 or the cancel option 136. Activating the cancel option 136 causes the collaboration platform to close the user interface 122 and return to the user interface 105 and no new workspace is created. Activating the continue option 134 causes the collaboration platform to create a placeholder workspace and associate the invited collaborators (if any) with the placeholder workspace. The collaboration platform also displays the user interface 140 shown in FIG. 1C in response to the user activating the continue option 134.

The user interface 140 provides the user with an opportunity to search for and associate project-related collateral with the new workspace. The user interface 140 includes a create workspace option 144 and a back option 146. Clicking on or otherwise activating the back option 146 causes the collaboration platform to display the user interface 122. Clicking on or otherwise activating the create workspace option 144 causes the collaboration platform to create the new workspace based on the information provided by the user in the user interfaces 122 and 140. The collaboration platform also sends invitations to invited collaborators in response to creating the new workspace.

The user interface 140 provides AI-powered search tools for identifying candidate collateral items. The collaboration platform analyzes one or more of a title associated with the workspace, keywords, and/or or a natural language description of the purpose of the workspace to identify the project-related collateral. The user can type in a natural language description of the purpose of the workspace into the textual description field 142. The collaboration platform analyzes the textual content from the textual description field 142 to identify keywords in the textual content. In some implementations, the collaboration platform analyzes the textual content using an NLP model that is trained to receive a textual input as an input and to identify keywords in the textual content. In some implementations, the NLP model is trained to identify enterprise-specific or organization-specific keywords associated with a particular enterprise or organization. The NLP model is implemented by a generative GPT model in some implementations, such as but not limited to GPT-3 or GPT-4. In some alternate implementations, the user specifies the keywords themselves, rather than relying on the model to identify the keywords.

The collaboration platform receives and highlights the keywords in the natural language description of the textual description field 142. The user may then click on or otherwise select a highlighted keyword to cause the collaboration platform to conduct a search for candidate collateral items. The candidate collateral items are presented in the content pane 148. In other implementations, the collaboration platform automatically conducts a search for the candidate collateral items in response to the user adding or modifying textual content of the textual description field 142. The content pane includes selection tabs 154 which allow the user to select which candidate collateral items are presented to the user and/or the order in which the candidate collateral items are presented. In some implementations, a separate tab is created for each of the keywords identified in the textual content added to the textual description field 142. The user can click on or otherwise activate a particular tab to show the candidate collateral items associated with that tab. For example, the "All Suggestions" tab displays all of the candidate collateral items that have been identified for all of the keywords.

If the user does not provide any textual description in the textual description field 142, the collaboration platform provides candidate project-related collateral suggestions based on the title of the workspace and/or the invited collaborators identified by the user.

The user can select one or more candidate collateral items from among the candidate collateral items 152 to be associated with the workspace by clicking on or otherwise selecting the one or more candidate collateral items. The user may determine that none of the candidate collateral items presented are relevant and instead update the textual content in the textual description field 142 to trigger the collaboration platform to identify the keywords in the updated textual content and query for a new set of candidate collateral items. The user may also elect to not select any candidate collateral items to be included in the workspace, and the workspace can be created without any project-related collateral and the user may add project-related collateral to the workspace at a later time. The user clicks on or otherwise activate the "Create Workspace" option 144 once the user is ready to create the workspace. The user can also click on or otherwise activate the back option 146 to return to the user interface 122 shown in FIG. 1B.

Figure 1D:
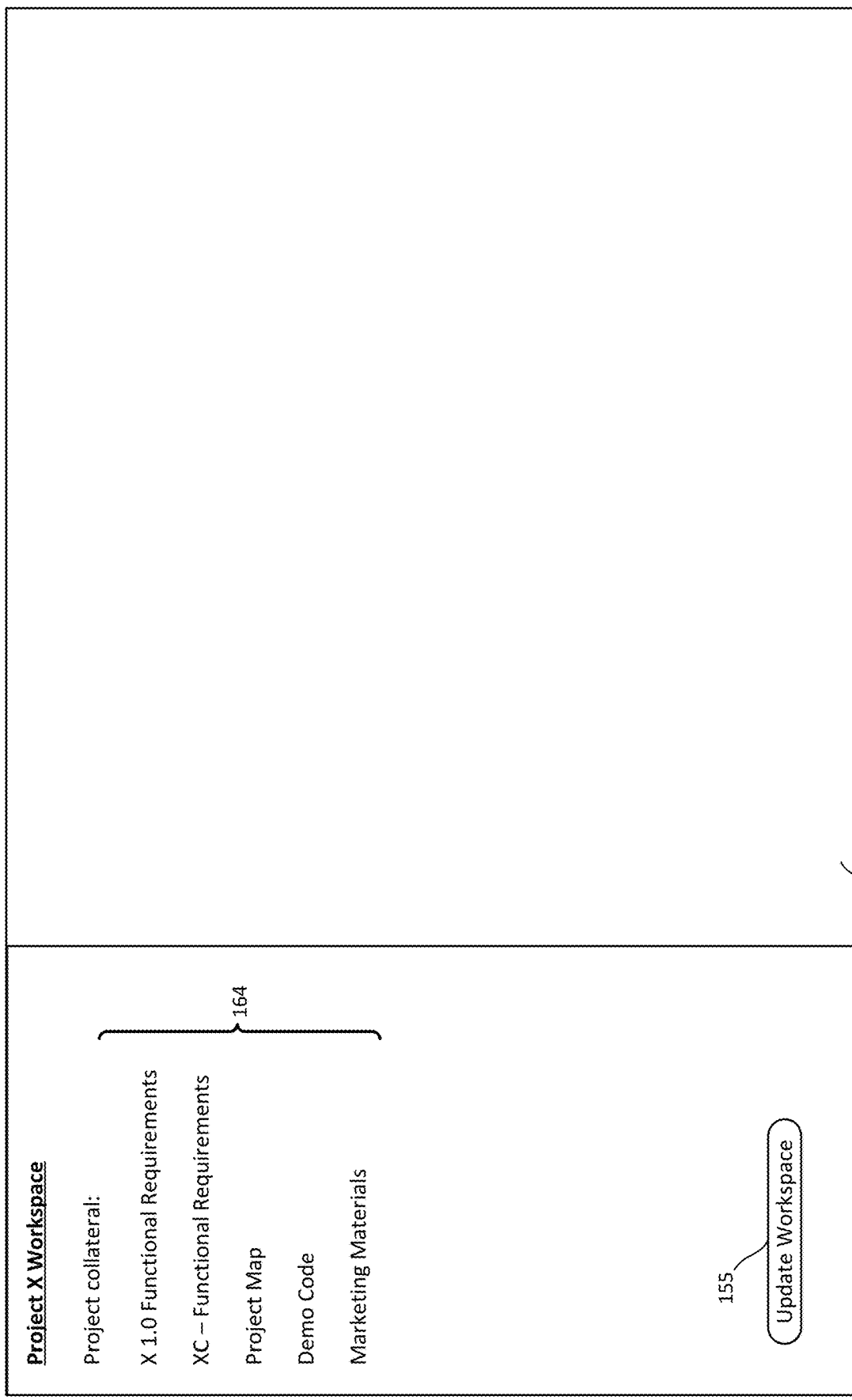

FIG. 1D shows a user interface 162 in which the workspace has been created. The user interface 162 is shown in response to the user clicking on or otherwise activating the "Create Workspace" option 144 or in response to the user selecting a workspace representation of the workspace representations 125 from the user interface 105 shown in FIG. 1A. The user interface includes a list of the project collateral 164. The user may click on or otherwise activate a collateral item from the list of the project collateral 164 to cause the collateral item to be presented in the content pane 166. In some implementations, the user interface 162 enables the user to view and/or modify the content items. Some types of content may not be directly viewable and/or editable from the user interface 162, and the collateral platform can cause an application capable of viewing and/or editing the collateral item to be launched on the client device of the user to permit the user to view and/or edit the collateral item.

The user interface 162 includes in an "Update Workspace" option 155. The "Update Workspace" option 155 allows the user to update the list of collaborators invited to access the workspace and/or search for additional collateral items to be associated with the workspace. Other implementations may include another interface and/or interface elements for updating the collateral items and/or the collaborators who have been invited to collaborate in the workspace.

Figure 2A:
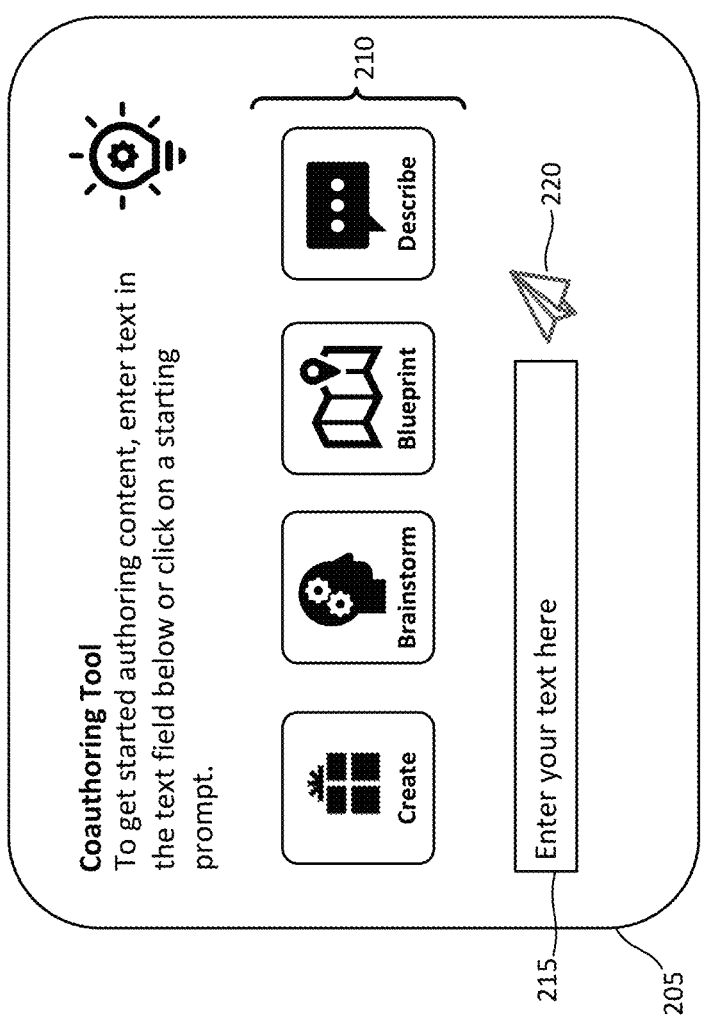
Figure 2B:
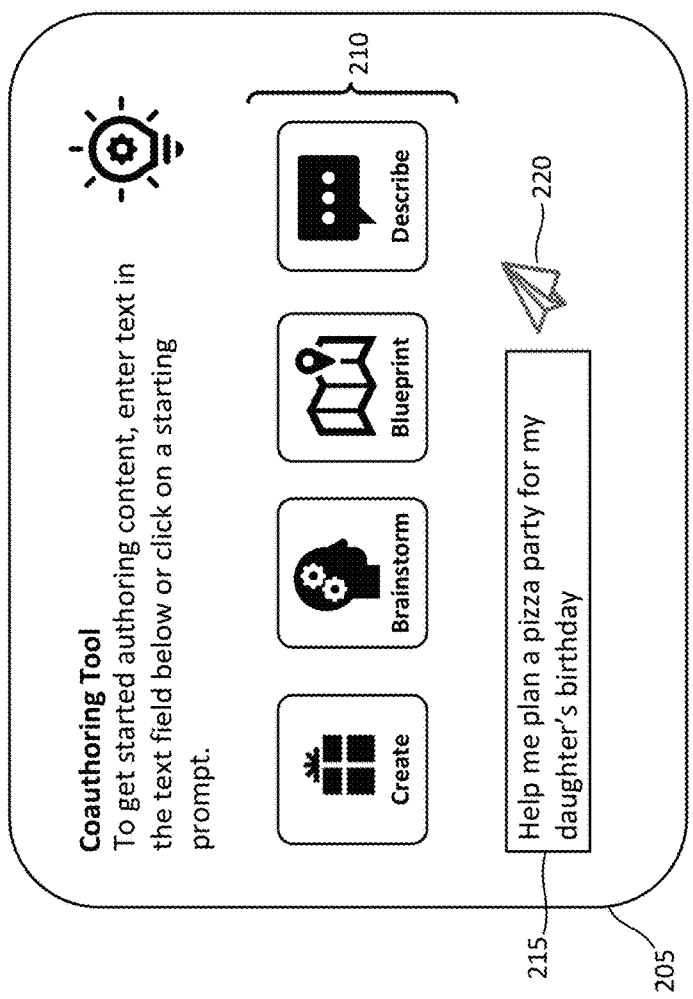

FIGS. 2A and 2B show an example of a coauthoring tool user interface 205. The coauthoring tool enables a user to begin coauthoring content with the AI and/or human collaborators. The content may include textual content, and may include formatted textual content, such as but not limited lists and tables. Furthermore, coauthoring tool user interface 205 enables the user to coauthor other types of content with the AI, such as but not limited to diagrams and drawings in other implementations. Yet other implementations enable the user to coauthor other types of electronic content with the AI and/or human collaborators. In the example shown in FIGS. 2A and 2B, the user initiates a coauthoring session with just the user and the AI. However, as discussed in detail in the example implementations which follow, the user may also collaborate with one or more other human users in addition to the AI.

The user interface 205 includes a set of context-specific action tiles 210 that provide the user with prompts to help get the user started coauthoring content with the AI. The user may click on or otherwise activate one of the action tiles to prompt a generative model, such as but not limited to the GPT-3 or GPT-4 model, to begin generating textual content of a particular type or style. In some implementations, the context-specific action tiles 210 provide options for generating content other than textual content, such as but not limited to diagrams or drawings. In the examples shown in FIG. 2A, the action tiles 210 have been selected from among available options based on the context of the user starting a new document. However, the action tiles 210 presented to the user can vary based on the context. For example, a different set of action tiles may be presented to the user for documents that have already been created, such as but not limited to options for summarizing or otherwise deriving content from the existing document.

The user can enter a textual prompt in the prompt field 215 to submit the generative model. The textual prompt may be entered in addition to or instead of selecting one of the action tiles 210. The textual prompt is provided as an input to the generative model in addition to a prompt associated with each type of action tile. The prompt associated with an action tile includes keywords or phrases that provide context to the generative model in some implementations. This context information informs the generative of the type of collaborative content that the user would like to create. The generative model uses the context information to determine a format and/or a level of detail of the collaborative content to be coauthored with the user. Providing a textual prompt provides additional information to the generative model that helps refine the collaborative content being coauthored with the AI. The textual prompt is provided as an input to the model where the user has not selected an action tile, and the generative model uses the textual content to determine the type of collaborative content to be generated.

FIG. 2B shows an example of the textual prompt having been entered by the user. In this example, the user is planning a party and requests help planning a party. The user can click on or otherwise activate the submit option 220 to cause the textual prompt and/or the selected action tile from among the action tiles 210 to be presented to the generative model as a prompt.

Figure 2C:
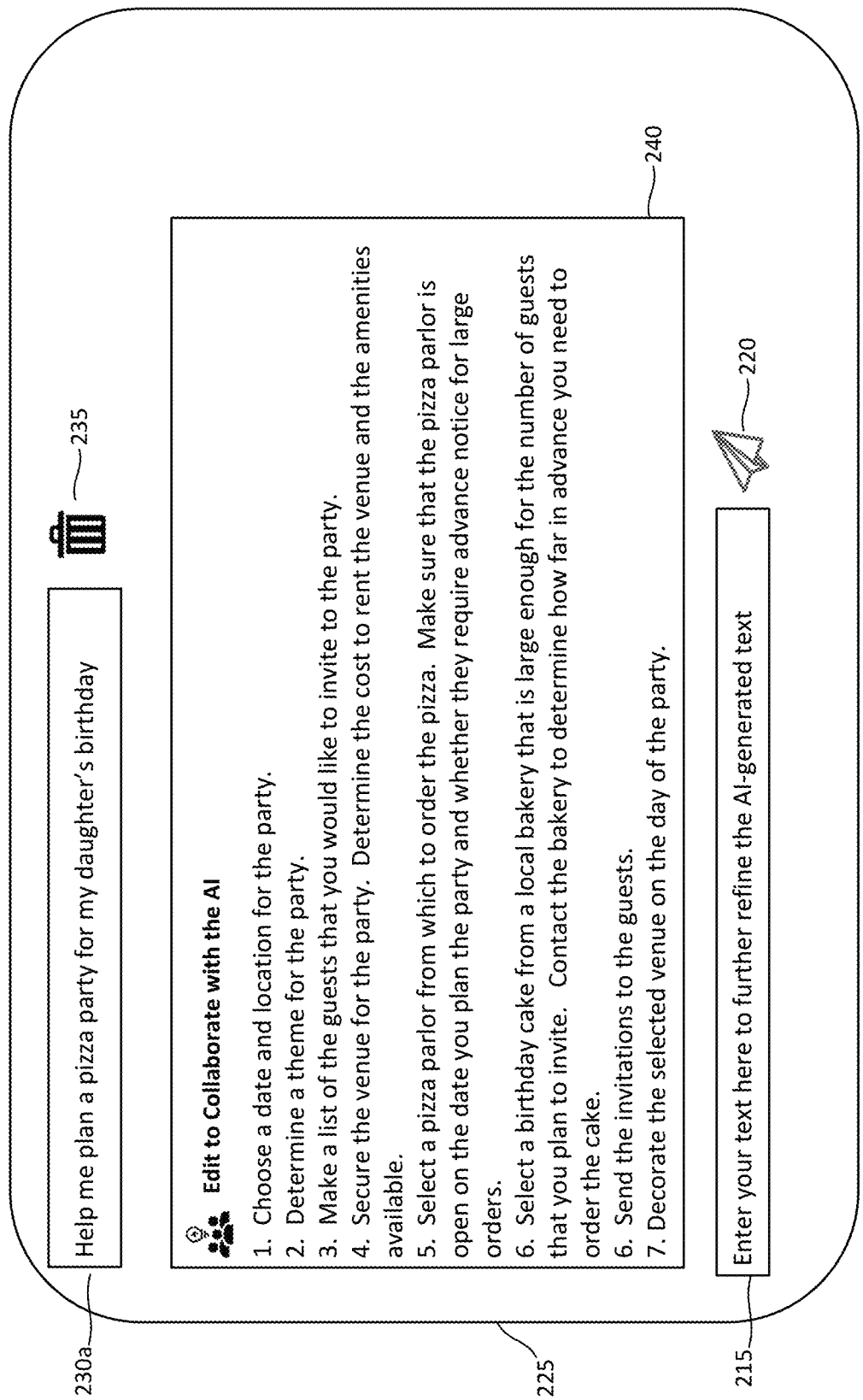

FIG. 2C shows an example collaborative authoring user interface 225. The user interface 225 is presented in response to the user selecting the submit option 220 in the user interface 205. The user interface includes a history section that includes the previously submitted prompts to the generative model. The previously submitted prompts may be submitted by the user and/or by one or more collaborators. The example shown in FIG. 2C includes just a single prompt 230a that was submitted by the user. The example implementation shown in FIGS. 2A-2G show the user collaborating with the AI to author content. However, the examples shown in FIGS. 3A-3G show examples in which the user is collaborating both with the AI and human collaborators to author content.

The content pane 240 includes the collaborative content generated by the generative model. While the example shown in FIGS. 2A-2G and 3A-3G include textual collaborative content, the collaborative content may include types of content, such as but not limited to diagrams and/or drawings. Furthermore, the textual content may be formatted into lists, tables, presentation slides, and/or other types of content in yet other implementations. The user can collaborate with the AI to refine the collaborative content in a couple of ways. First, the user may directly edit the collaborative content included in the content pane 240, and the edited content is provided as a subsequent prompt to the generative model to further refine the generated content. Second, the user may enter a textual prompt in the prompt field 215, in manner similar to that shown in the user interface 205. As will be shown in the examples which follow, the user may both edit the collaborative content and provide a textual prompt in the prompt field 215 to provide as an input to the generative model. Once the user is satisfied with their edits to the collaborative content of the content pane 240 and/or the textual prompt, the user can click on or otherwise activate the submit option 220 to cause the revised collaborative content and/or the textual prompt from the prompt field 215 to be submitted to the generative model. A technical benefit of allowing the user to directly modify the collaborative content is that such an approach is typically how a user would collaborate with other human users to collaboratively author content. The user and/or the collaborators make edits to the content. Current tools that use generative models to generate text do not take such an approach. The AI-generated output in such tools is typically static content, and the user must type a textual prompt, such as that provided int the prompt field 215, as an input to the generative model to try to cause the model to make changes to the AI-generated text. The approach provided herein improves the user workflow and the user experience by providing the user with more control over the inputs that are provided to the model to cause the model to refine the collaborative content.

Figure 2D:
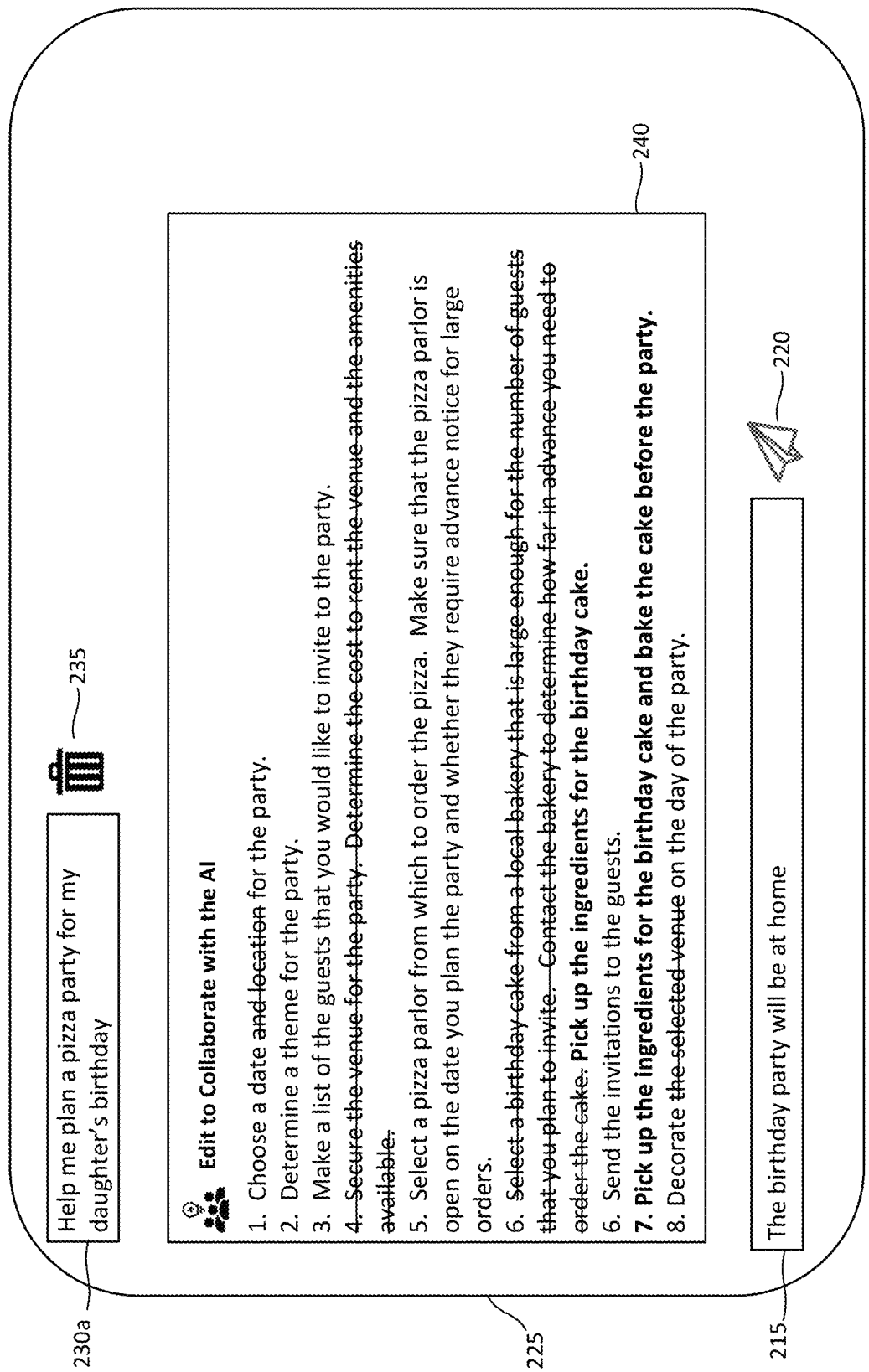

FIG. 2D shows an example of the user interface 225 in which the user has both edited the collaborative content of the content pane 240 and provided a textual prompt in the prompt field 215. The strikethrough text indicates text that has been deleted from the collaborative content by the user, while bold text indicates text that has been added to the collaborative content by the user. The user may also make structural changes to the collaborative content as well, such as but not limited to changes to a diagram or drawing, adding or removing entries in a list, and/or changing the structure of a table or other data structure. Other implementations may utilize other markup techniques to provide a visual indication to the user of the changes that the user or a collaborator has made to the AI-generated content.

Figure 2E:
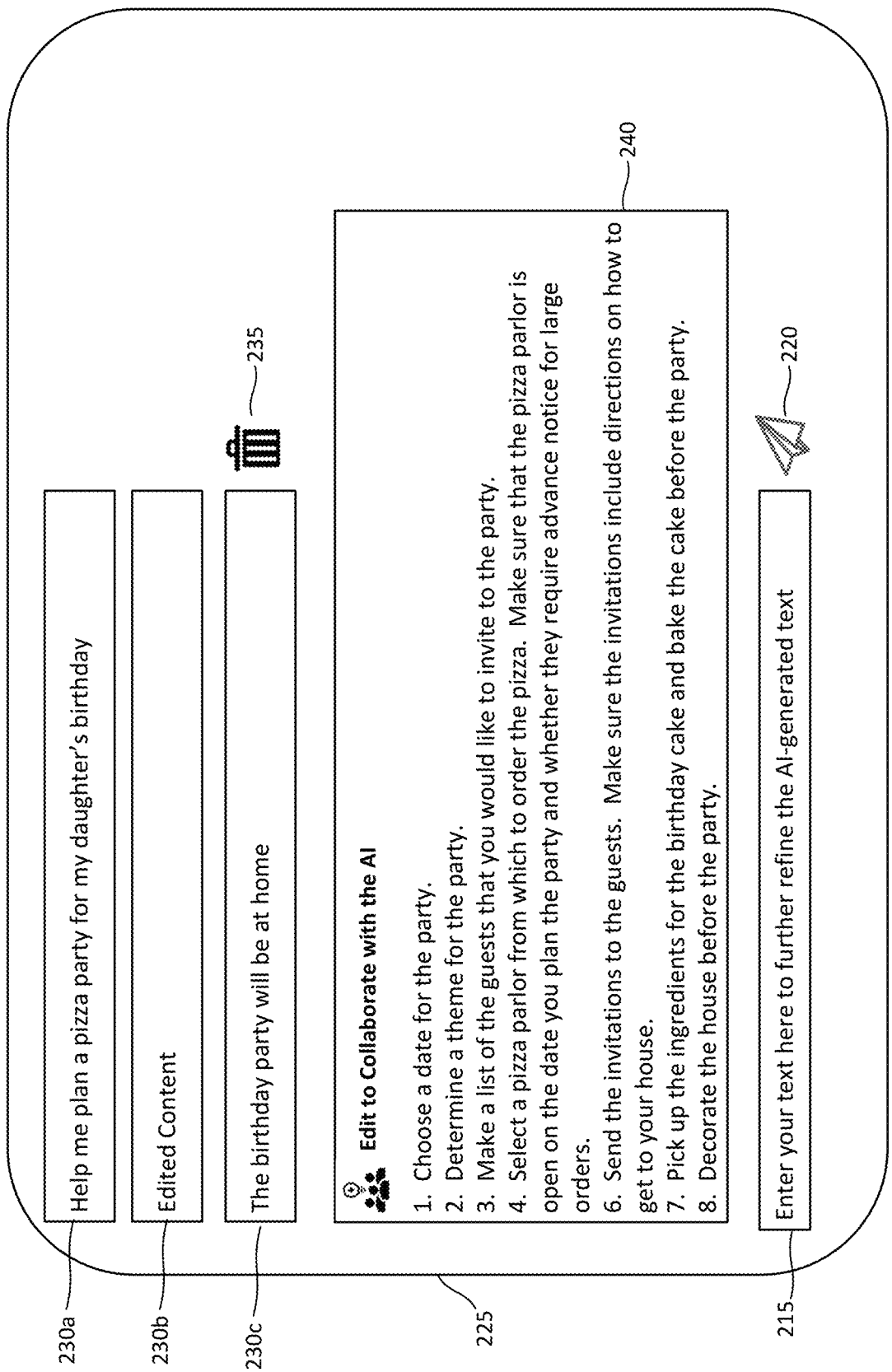

FIG. 2E shows how the history section at the top of the user interface 225 reflects the prompts that were provided to the generative model during the authoring session. The history now shows three entries 230*a*, 230*b*, and 230*c*, which reflect the prompts that the user provided to the generative model to refine the collaborative content. The updated collaborative content is shown in the content pane 240. The user may click on or otherwise activate an entry in the history section to cause the user interface to show the state of the collaborative content when that prompt was submitted to the generative model. The user interface also includes a delete 235 that allows the user to delete the most recent prompt and revert to the prior version of the collaborative content. This enables the user to recover the prior version of the collaborative content if the user is not happy with how that prompt caused the model to refine the collaborative content.

Figure 2F:
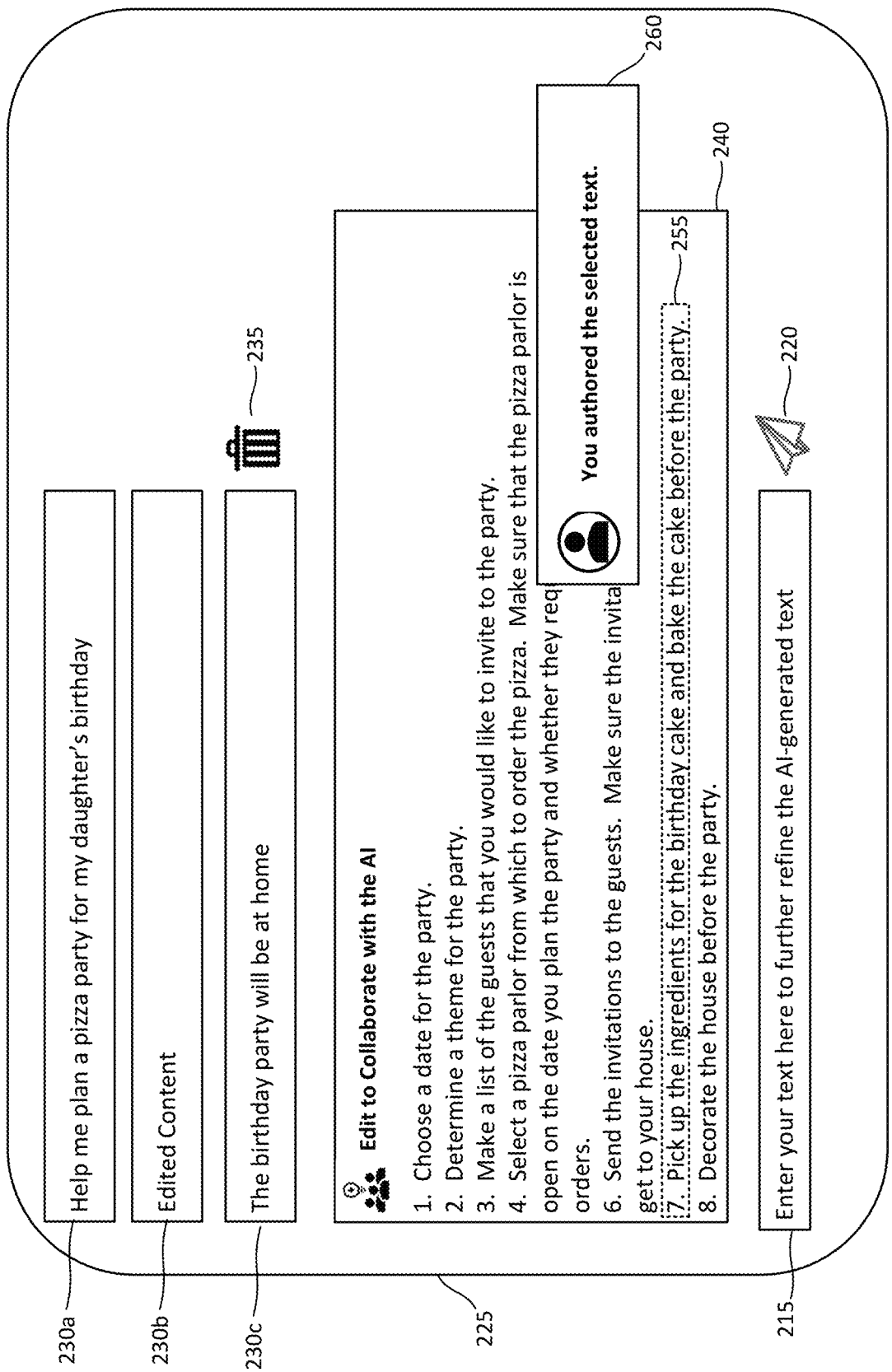
Figure 2G:
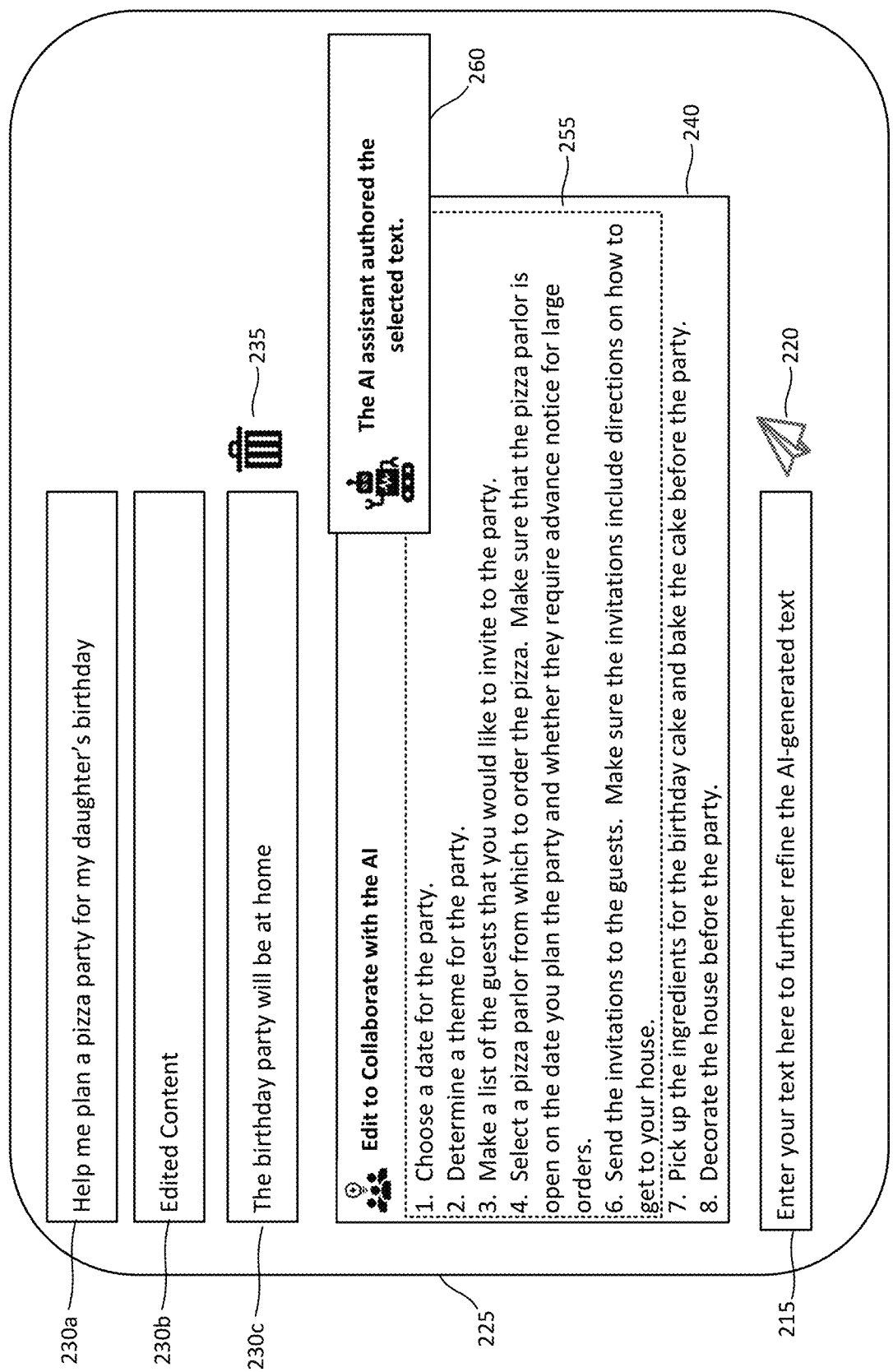

FIG. 2F shows an example of an attribution feature that is provided by the techniques herein. The attribution feature allows the user and/or the collaborators participating in the collaborative authoring of content to determine whether a human user or the AI generated a particular portion of the text shown in the content pane 240. As shown in the FIG. 2E, the user and/or a collaborator can make changes to the AI-generated content shown in the content pane 240, and the revised collaborative content is provided as an input to the generative model to further refine the collaborative content. The generative model may retain at least a portion of the user-provided content in the refined collaborative content. The attribution feature enables the user and/or the collaborators to keep track of which portions of the content were created by a user or the collaborator and which portions were created by the AI. In the example shown in FIG. 2F, the user can click on or otherwise select a section of the collaboration content shown in the content pane 240 to cause the collaboration platform to present attribution information. In the example shown in FIG. 2F, the user has selected section 255 of the collaboration content shown in the content pane 240, and the collaboration platform causes the attribution information 260 to be presented. FIG. 2G shows another example in which the user has selected a different selection section 255 of the textual content, and the collaboration platform causes the attribution information 260 to be presented for that selected section. Where multiple users have contributed to the content, the attribution information includes information for each of the contributors. Similar attribution is provided for other types of content, such as but not limited to entries in a list or a table and/or portions of a diagram or drawing.

Figure 3A:
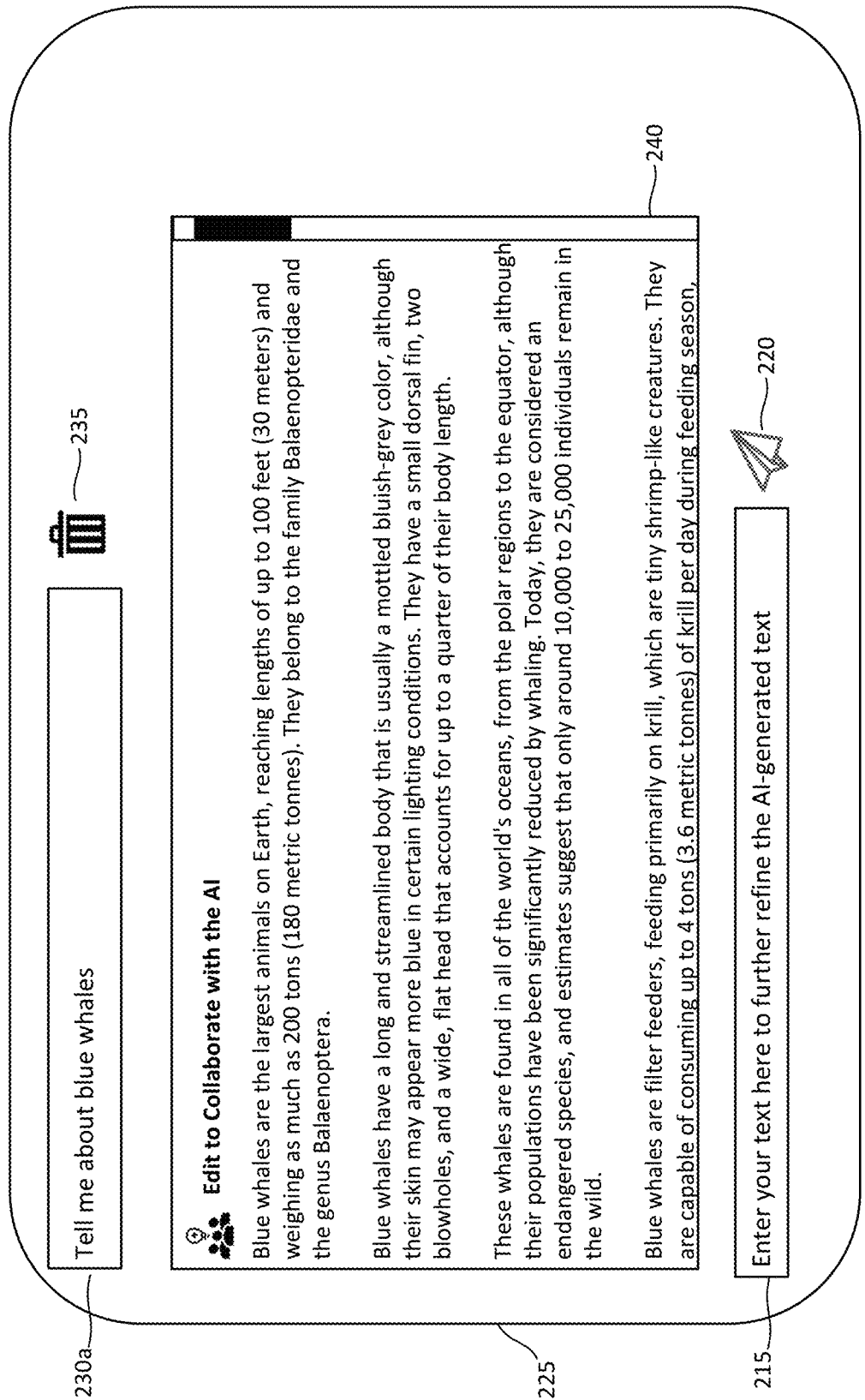
Figure 3B:
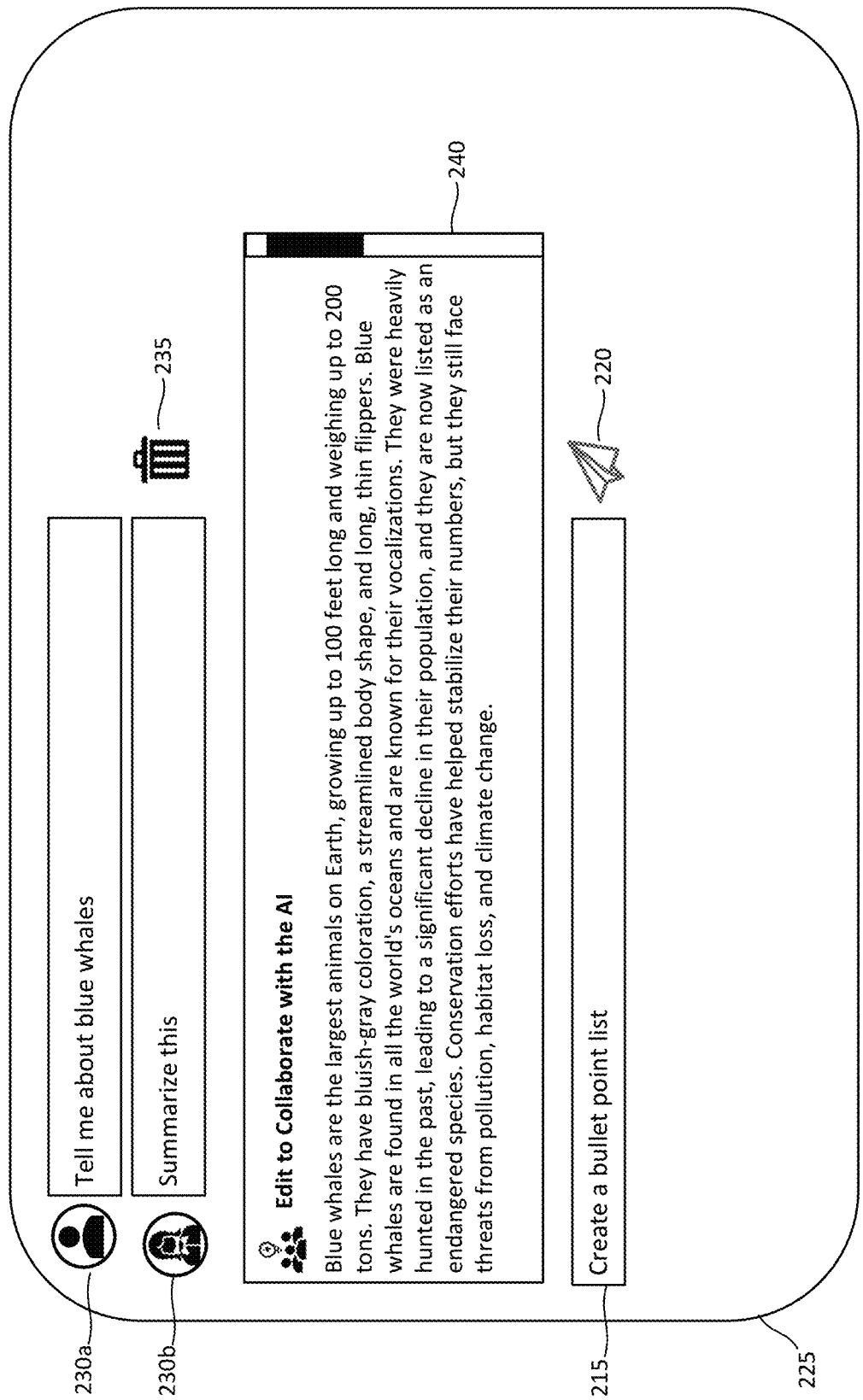
Figure 3C:
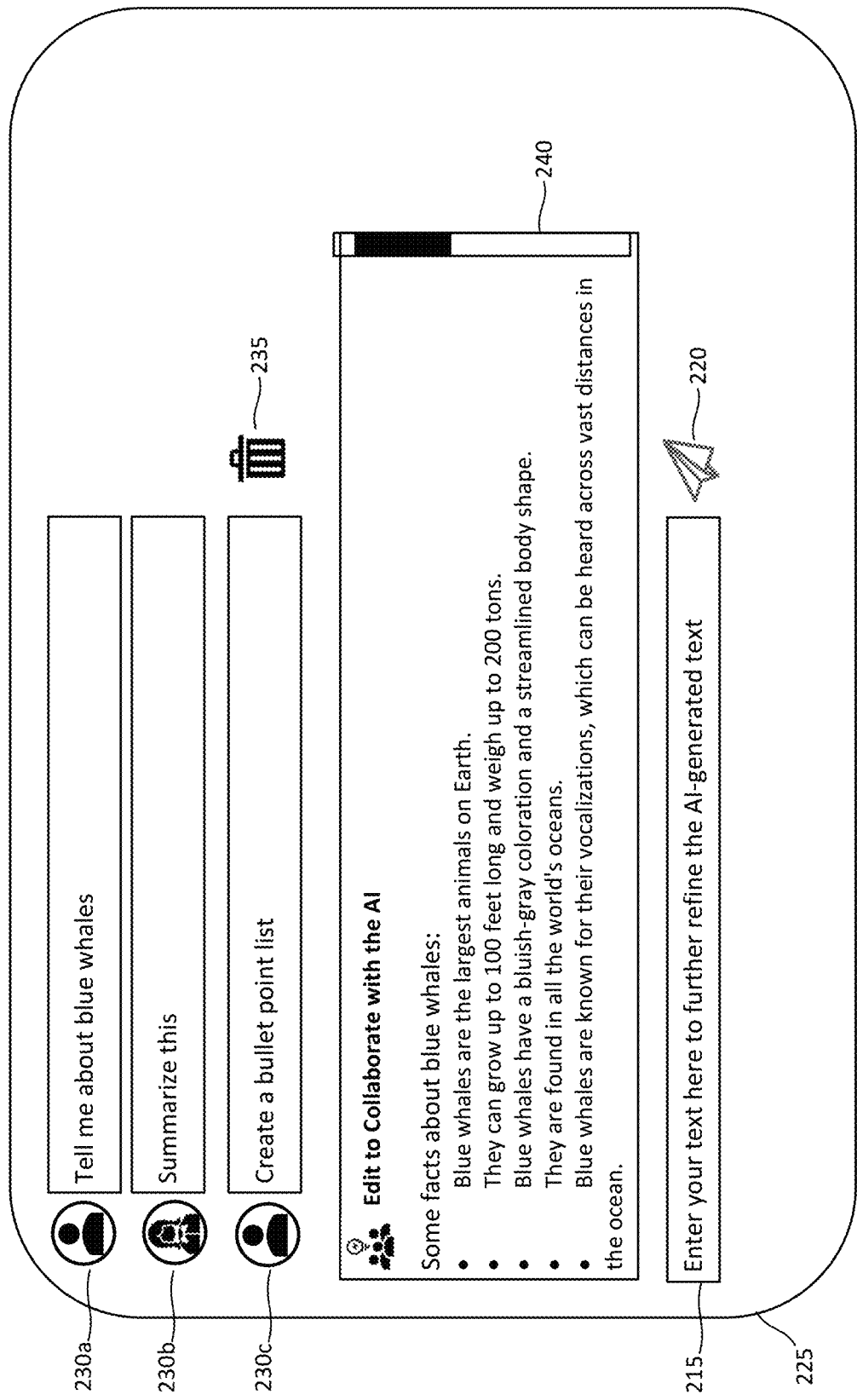
Figure 3D:
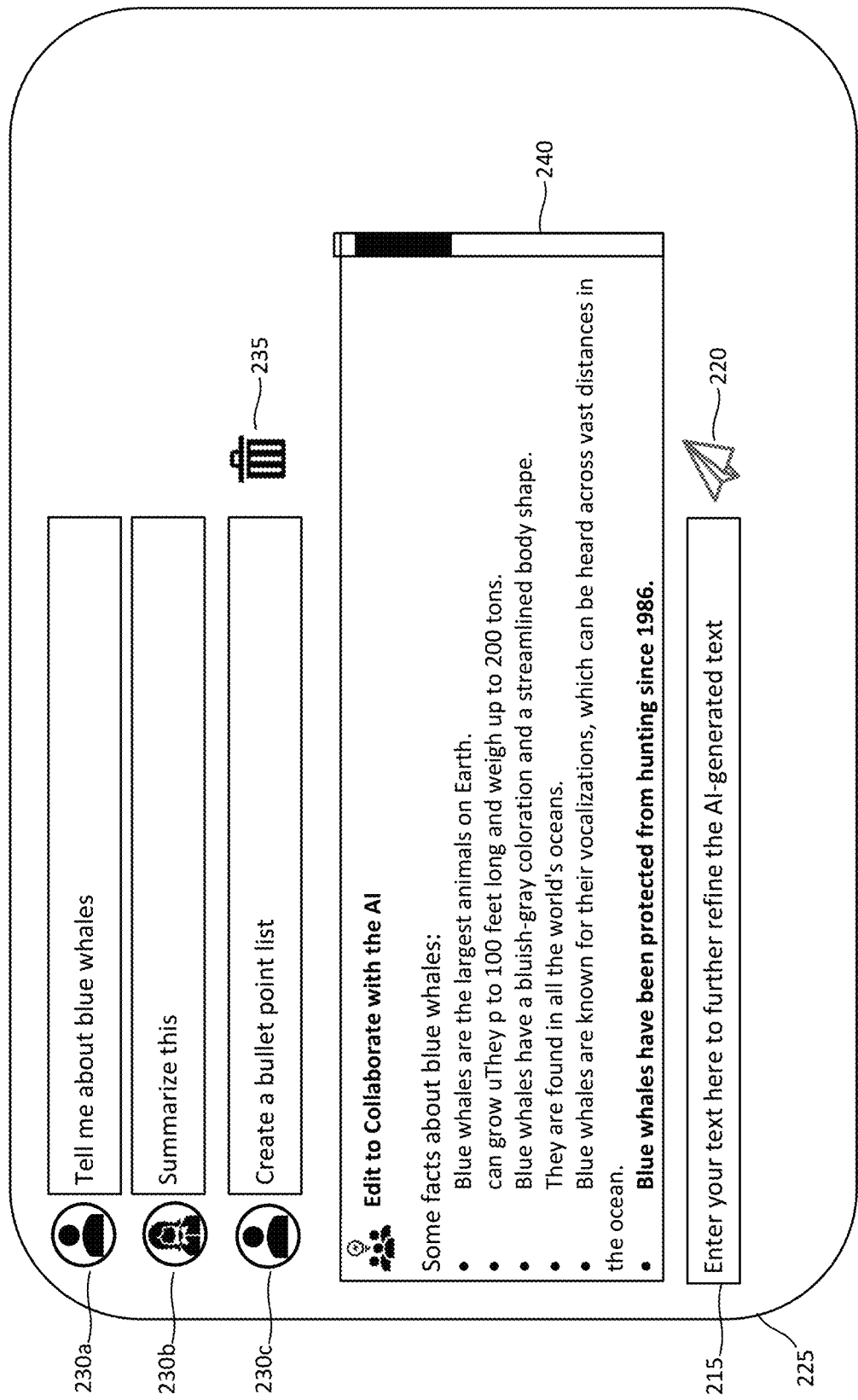

FIGS. 3A-3G show an example of the user interface 205 in which the user is collaborating with both the AI and a human collaborator. While these examples show a single human collaborator, more than one human collaborator can contribute to the collaborative authoring session with the user and the AI. In FIG. 3A, the user has submitted an initial prompt to the generative model to obtain the textual content shown in the content pane 240. In other implementations, other types of content may be generated by the generative model, such as but not limited to formatted textual content, diagrams, or drawings. In FIG. 3B, a human collaborator has submitted a second prompt to the generative model to request that the generative model to summarize the collaborative content shown in FIG. 3A. The history section of the user interface 225 shows both the user generated prompt 230*a* and the collaborator generated prompt 230*b*. FIG. 3C shows another example of the user interface 225 after the user has submitted a third prompt 230*c* to request that the generative model provide a bullet point list based on the collaborative content shown in FIG. 3B. FIG. 3D shows an example in which the user has edited the collaborative content in the content pane 240 to add additional text. The user submits this as a prompt to the generative model, and the history section of the user interface 225 is updated to add the prompt 230*d* indicating that the user has edited the collaborative content. The revised collaborative content is shown in the content pane 240. The user or collaborator may also enter a textual prompt in the prompt field 215 in addition to or instead of editing the collaborative content shown in the content pane 240. Furthermore, the user or a collaborator can click on or otherwise select a section of the textual content in the content pane 240 in order to obtain attribution information as discussed with respect to FIGS. 2F and 2G. In implementations in which the generative content is not textual content, the user may click on or otherwise select a portion of the collaboration content to obtain attribution information.

Figure 3E:
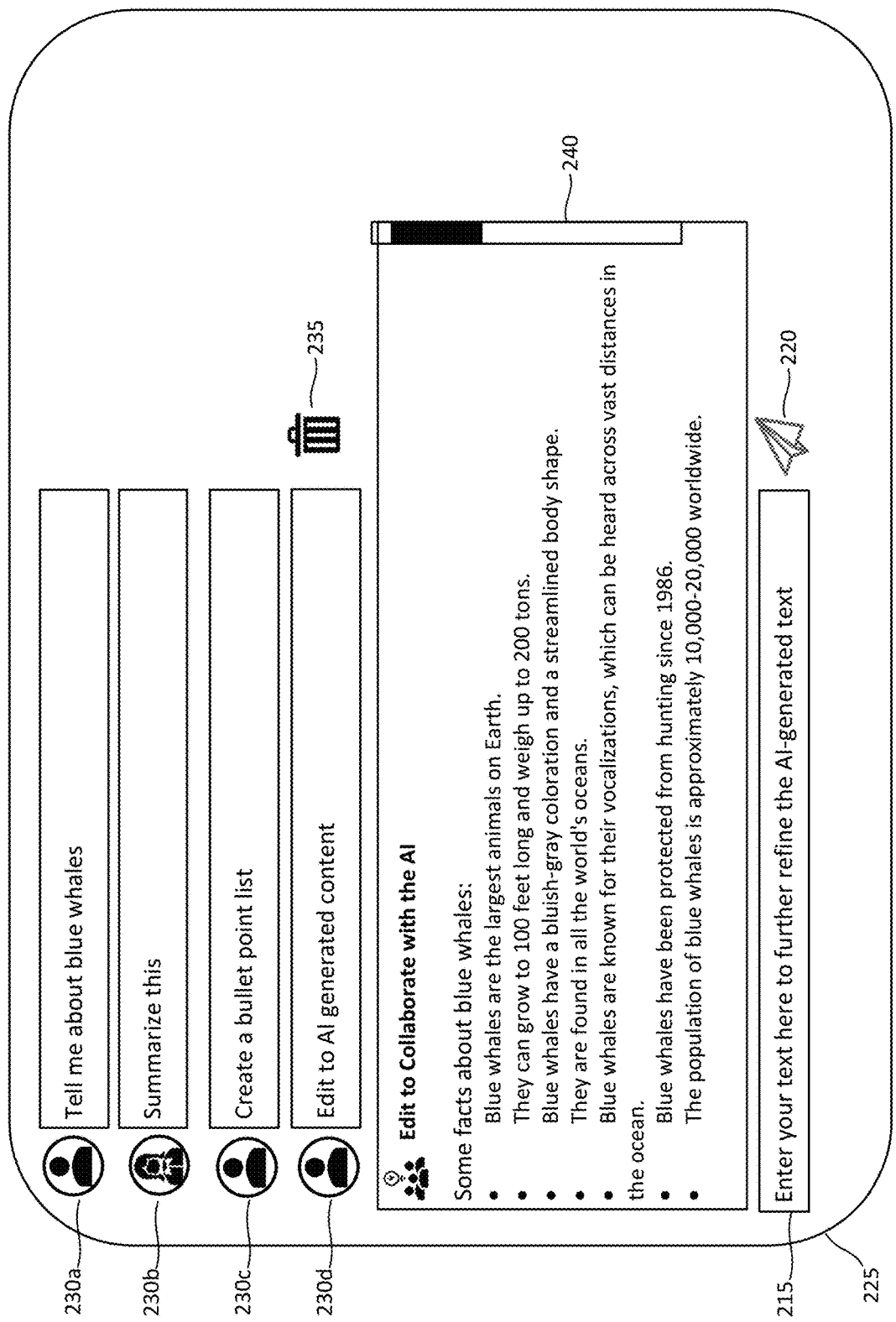
Figure 3F:
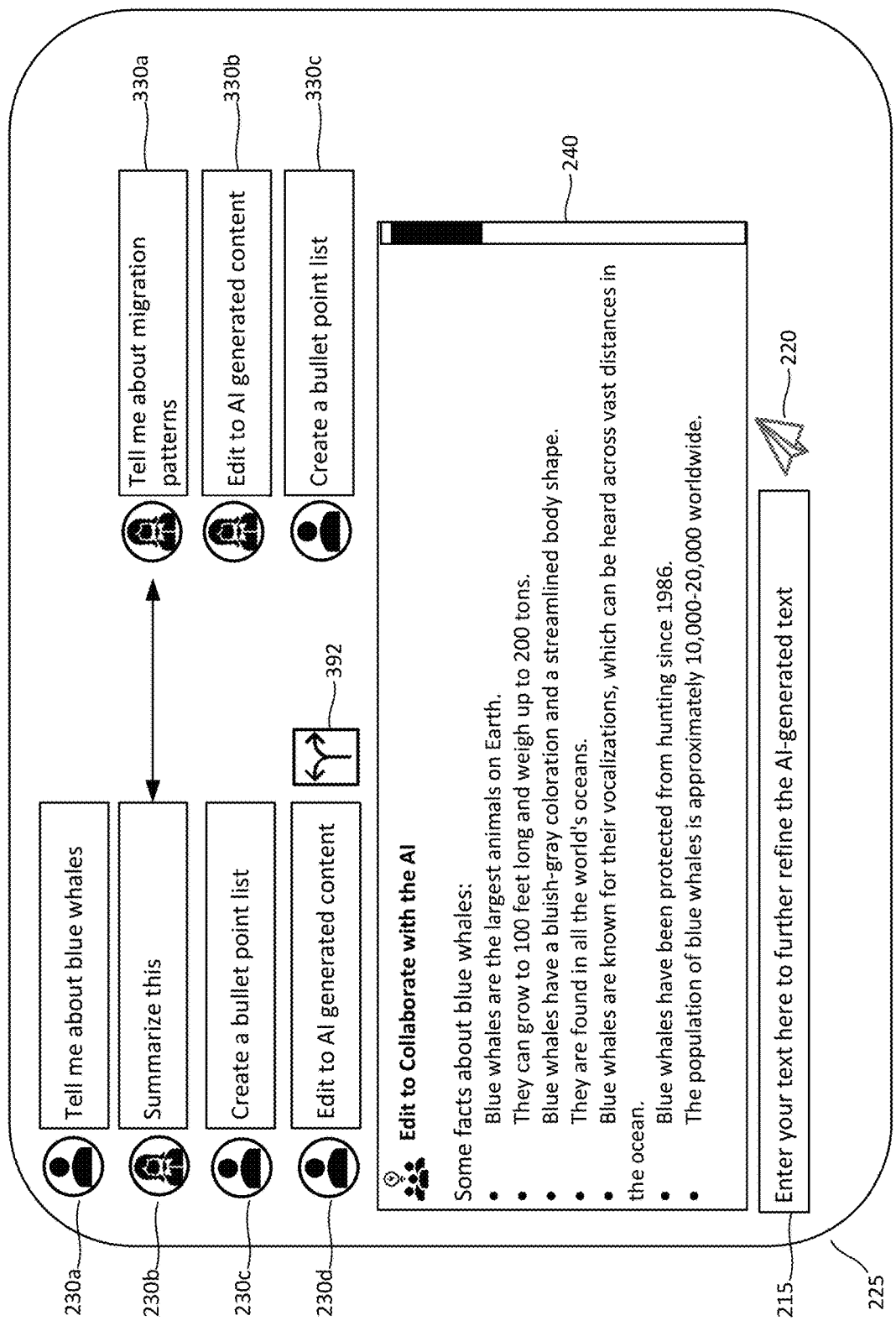
Figure 4:
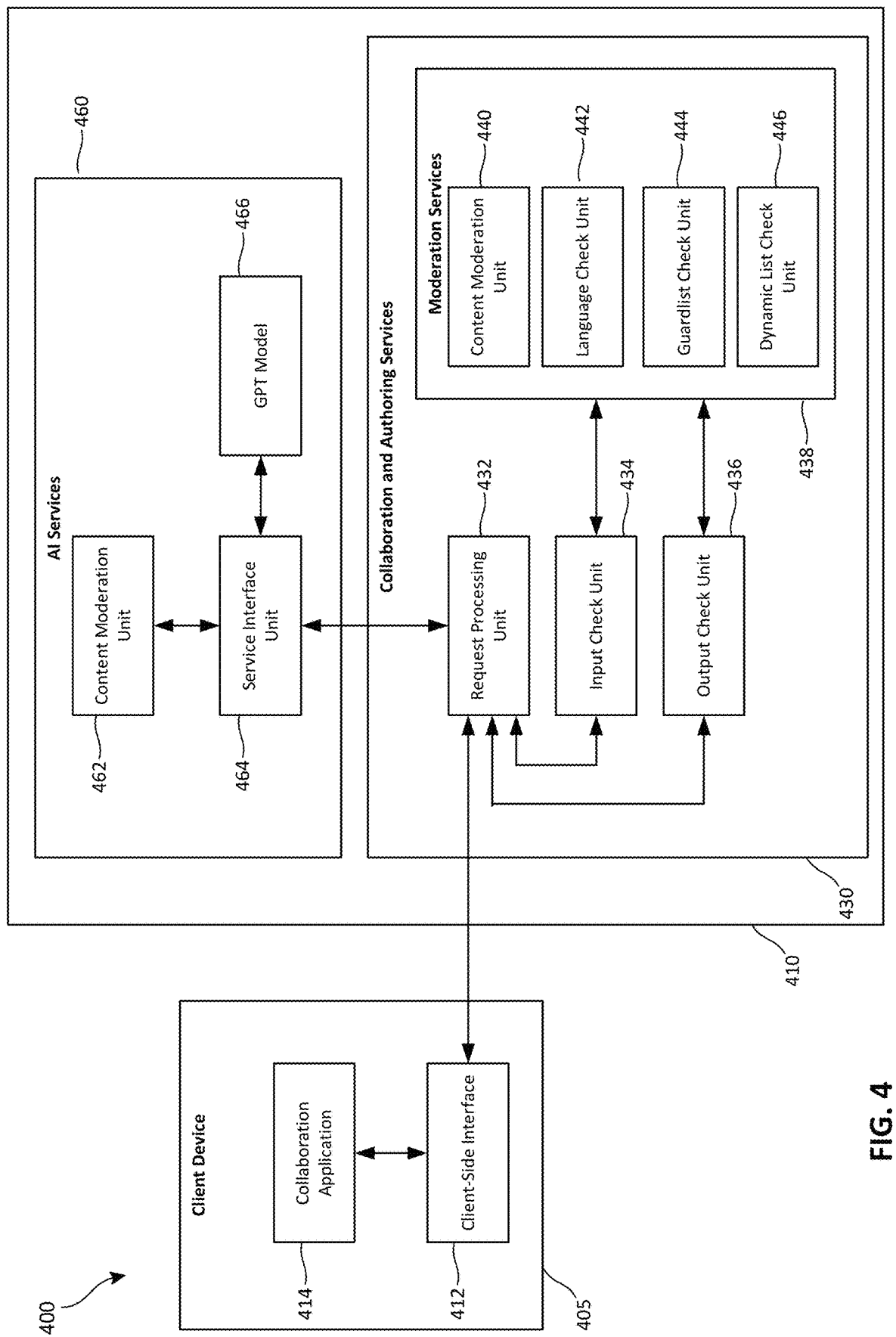
FIG. 4 is a diagram of an example computing environment in which the generative AI-related features of the collaboration platform may be implemented.

FIGS. 3E-3F show an example of the user interface 225 in which the history of the prompts submitted to the generative model in FIG. 3E have been forked into two separate branches in FIG. 3F. The first branch includes the prompts 230*a*, 230*b*, 230*c*, and 230*d*. The second branch includes the prompts 330*a*, 330*b*, and 330*c*. The user or a collaborator can initiate a fork in the history for an authoring session by clicking on or otherwise activating the fork control 392 in some implementations. In the example shown in FIG. 3F, the fork has been initiated at the prompt 230*b* using the fork control 392 by the collaborator participating in the collaborative authoring session with the user. Creating a fork in the history of the collaborative authoring session permits the user and/or the collaborators to explore how different sets of prompts and edits to the collaborative content helps to refine the collaboration content. The user can click on or otherwise activate the entries in each of the branches of the history to see how the prompts and/or edits associated with those branches impacted the collaborative content.

FIG. 3G shows an example of the coauthoring tool user interface 225 being used to analyze content that has already been generated. The coauthoring tool user interface 205 can be launched from the user interface 162 to analyze content associated with the workspace. In the example shown in FIG. 3G, the user has entered a command to cause the coauthoring tool user interface 205 to be presented in the content pane 166 in which a document is open for viewing or editing. The context-specific action tiles 210 in this example include options for causing the generative model to generate a summary of the document or a bullet point list of from the document. In some implementations, the context-specific action tiles 210 include options for generating type of content other than textual content, such as but not limited to audio content, video content, imagery based on the document. The specific types of audio content that may be generated may vary from implementation to implementation.

FIG. 4 is a diagram showing an example computing environment 400 in which the techniques disclosed herein for providing collaborative coauthoring with AI may be implemented. The computing environment includes a device 405 and a collaboration platform 410. The collaboration platform includes the collaboration and authoring services 430 and the AI services 460.

The client device includes a collaboration application 414, which is a web-enabled native application that is configured to obtain content and/or services from the collaboration platform 410. The client-side interface 412 provides an interface for sending data from the collaboration application 414 to the collaboration platform 410 and for receiving data from the collaboration application 414 for the client device 405.

The collaboration and authoring services 430 include a request processing unit 432, an input check unit 434, an output check unit 436, and moderation services 438. The AI services 460 include a service interface unit 464, a GPT model 466, and a content moderation unit 462. The request processing unit 432 is configured to receive requests from the client-side interface 412 that include prompts for the GPT model 466 to produce collaborative content. The prompts can include a textual prompt, such as the textual prompt entered into the prompt field 215 and/or a prompt associated with an action tile as discussed in the preceding examples. The prompts may also include collaborative content that has been revised by the user, such as the textual content of the content pane 240 discussed in the preceding examples. However, the collaborative content is not limited to textual content and may include other types of content, such as but not limited to diagrams or drawings. Furthermore, the textual content may include formatted textual content, such as but not limited to tables and lists. The request processing unit 432 provides the textual prompt and/or the revised collaborative content to the input check unit 434. The input check unit 434 submits the textual prompt and/or the revised collaborative content to the moderation service 438 for analysis. The moderation services 438 perform checks on the textual prompt and/or the revised collaborative content to ensure that these inputs do not include any potentially offensive language. For non-textual collaborative content, the moderation services 438 perform preprocessing on the textual content to extract a description of the content prior to performing the checks on the content in some implementations. This preprocessing may include image analysis to identify a subject matter of the content and/or optical character recognition to extract textual components of the content for diagrams and/or drawings. The moderation services 438 performs several types of checks on the inputs to the GPT model 466 and the output from the GPT model 466. The content moderation unit 440 is implemented by a machine learning model trained to analyze the textual inputs to perform a semantic analysis on the content to predict whether the inputs include potentially offensive language. The language check unit 442 performs another check on the textual inputs using a second model configured to analysis the words and/or phrase used in textual content to identify potentially offensive language. The guardlist check unit 444 is configured to compare the language used in the inputs with a list of prohibited terms including known offensive words and/or phrases. The dynamic list check unit 446 provides a dynamic list that can be quickly updated by administrators to add additional prohibited words and/or phrases. The dynamic list may be updated to address problems such as words or phrases becoming offensive that were not previously deemed to be offensive. The words and/or phrases added to the dynamic list may be periodically migrated to the guardlist as the guardlist is updated. The specific checks performed by the moderation services 438 may vary from implementation to implementation. If one or more of these checks determines that that the textual prompt and/or the revised collaborative content received from the client device 405 includes potentially offensive content, the request is rejected and the input check unit 434 provides an indication to the request processing unit 432 that the request has been rejected. The request processing unit 432 notifies the client device 405 that the request has been rejected. Otherwise, the request processing unit 432 provides the request to the AI services 460 for processing.

The service interface unit 464 of the AI services 460 receives the request from the request processing unit 432 and provides the textual prompt and/or the revised collaborative content to the GPT model 466 as an input. The GPT model 466 analyzes these inputs and outputs collaborative content based on these inputs. As indicated in the preceding examples, the model may include human generated content that was generated by the user or a collaborator in the collaborative content. In some implementations, the model associates attribution information with the content so that the user and/or collaborators can determine whether a human user or the AI generated a particular portion of the content. In other implementations, the request processing unit 432 associates the attribution information with the content so that the user and/or collaborators can determine whether a human user or the AI generated a particular portion of the content. The request processing unit 432 can keep track of changes made by a human user or the AI by comparing a previous version of the collaborative content with a current version of the collaborative content that has been modified by a user via the collaboration application 414 or by GPI model 466 of the AI services 460. The attribution information is associated with the collaborative content and is stored in a persistent collaborative content datastore, such as workspace datastore used by the collaborative platform 410 to store information about workspaces and the collateral items associates with each of the workspaces.

The service interface unit 464 provides the collaborative content output by the GPT model 466 to the content moderation unit 462 for analysis. The content moderation unit 462 analyzes the content to identify any potentially offensive content included in the collaborative content and provides an indication to the service interface unit 464 whether the collaborative content passes or fails. The content moderation unit 462 is implemented similarly to the content moderation unit 440 in some implementations. The service interface unit 464 is configured to discard the AI-generated output if the content fails testing. Otherwise, the service interface unit 464 provides the AI-generated output to the request processing unit 432 for processing.

The request processing unit 432 provides the collaborative content to the output check unit 436. The output check unit 436 operates similarly to the input check unit 434. The output check unit 436 provides the collaborative content to the moderation services 438 for analysis. If the content fails one or more of the moderation checks, the output check unit provides an indication to the request processing unit 432 that the collaborative content should be discarded. The request processing unit 432 may send another request to the AI services 460 for new content and/or send an indication to the client device 405 that an error occurred, and the request may be resubmitted. Otherwise, if the collaborative content passes the moderation checks, the request processing unit 432 sends the collaborative content to the client-side interface 412, and the client-side interface 412 provides the collaborative content to the collaboration application 414 for presentation to the user. As discussed in the preceding examples, the collaborative content may be presented to the user in the content pane 240 of the user interface 225.

Figure 5A:
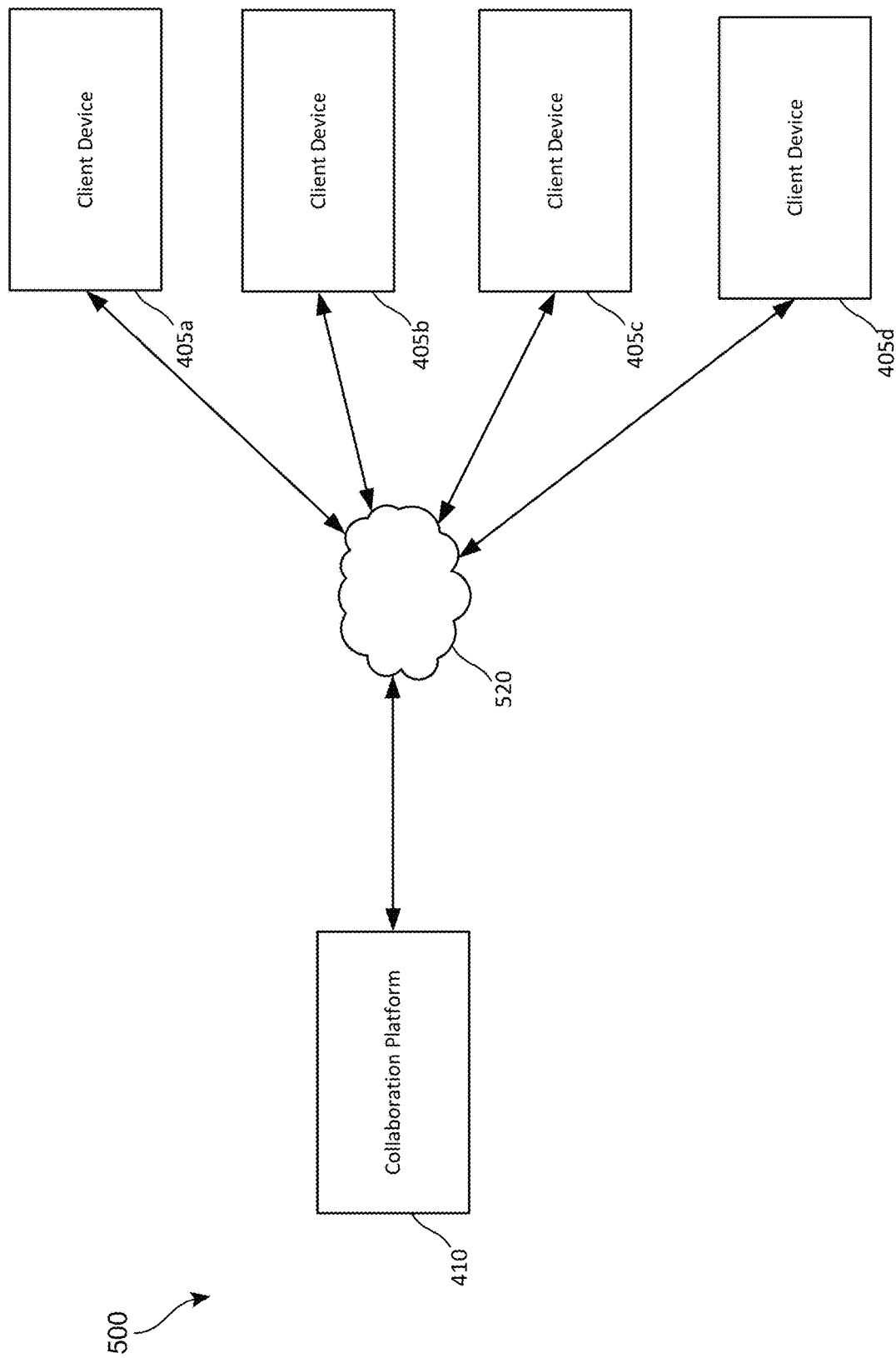
FIG. 5A is a diagram of an example computing environment in which the techniques disclosed herein for collaborative coauthoring may be implemented.

FIG. 5A is a diagram showing an example computing environment 500 in which the techniques disclosed herein for providing collaborative coauthoring with AI may be implemented. The computing environment 500 shows various elements associated with an implementation of a collaboration platform 410 and client devices 405a-405d (collectively referred to as client device 405). The collaboration platform 410 provides tools that enable multiple users to collaborate with one another in a cohesive manner to create, prepare, review, and/or format various types of electronic content. As discussed in the preceding examples, the collaboration platform can implement the user interfaces shown in FIGS. 1A-3G. Users may access the services provided from a client device, such as the client devices 405a-505d. The client devices 405a-405d communicate with the collaboration platform 410 via the network 520. The network 520 may be a combination of one or more public and/or private networks and may be implemented at least in part by the Internet.

In the example shown in FIG. 5A, the collaboration platform 410 is implemented as a cloud-based service or set of services. The collaboration platform 410 implements the functionality for providing the AI-powered aggregation of project-related collateral as discussed with regard to FIGS. 1A-3G.

The client devices 405a, 405b, 405c, and 405d are each a computing device that are implemented as a portable electronic device, such as a mobile phone, a tablet computer, a laptop computer, a portable digital assistant device, a portable game console, and/or other such devices in some implementations. The client devices 405a, 405b, 405c, and 405d are also implemented in computing devices having other form factors, such as a desktop computer, vehicle onboard computing system, a kiosk, a point-of-sale system, a video game console, and/or other types of computing devices in other implementations. While the example implementation illustrated in FIG. 5A includes four client devices, other implementations may include a different number of client devices that utilize service provided by the collaboration platform 410. Furthermore, in some implementations, a portion of the functionality provided by the collaboration platform 410 is implemented by a native application installed on the client devices 405a, 405b, 405c, and 405d, and the client devices 405a, 405b, 405c, and 405d communicate directly with the collaboration platform 410 over a network connection.

Figure 5B:
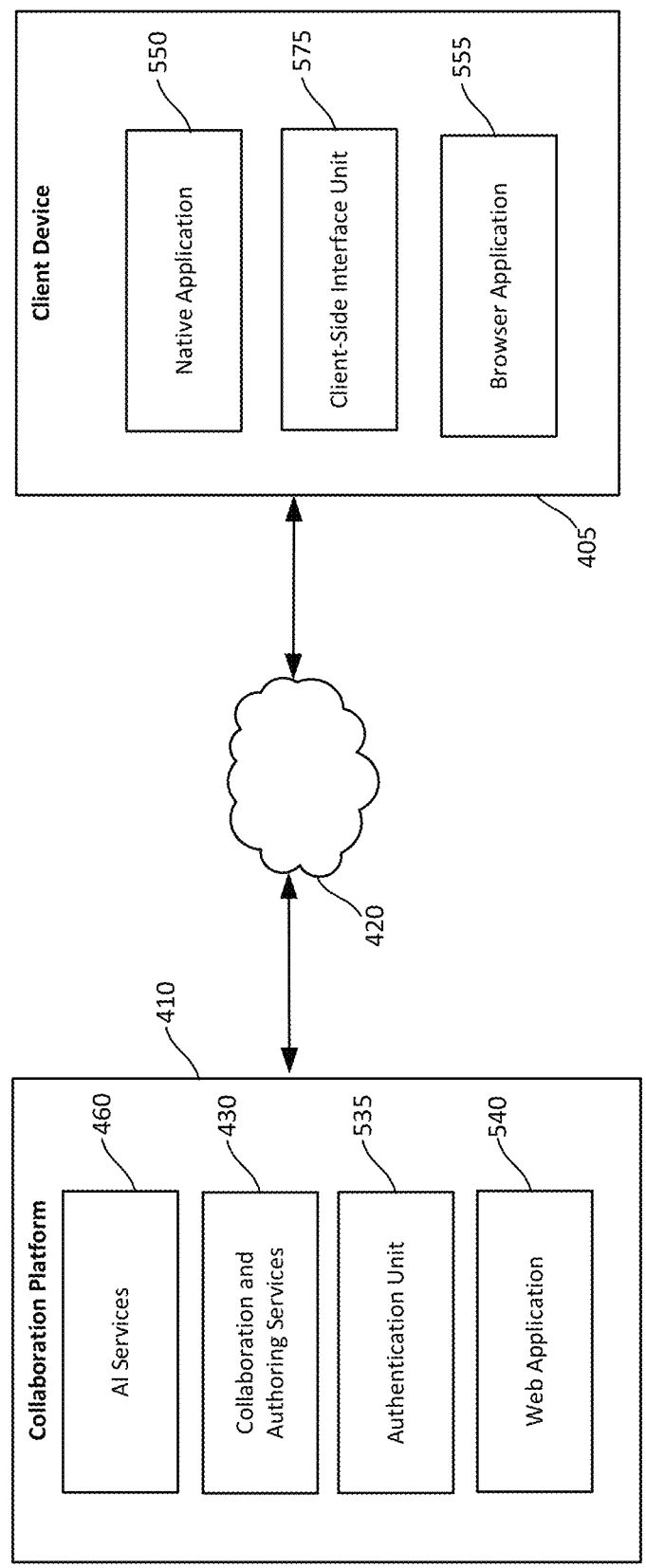
FIG. 5B is a diagram showing additional features of the collaboration platform and the client devices shown in FIG. 5A.

FIG. 5B is a diagram showing additional features of the collaboration platform 410 and the client device 405. The collaboration platform 410 includes the AI services 460, the collaboration and authoring services 430, an authentication unit 535, and a web application 540. The AI services 460 and the collaboration and authoring services 430 are described in detail with respect to FIG. 4.

The authentication unit 535 provides functionality for verifying whether users are permitted to access the services provided by the collaboration platform 410. In some implementations, the authentication unit 535 provides functionality for receiving authentication credentials for the users from the respective client device 405 of the user. The authentication unit 535 verifies that the authentication credentials are valid and permits the users to access the services provided by the collaboration platform 410 responsive to the authentication credentials being valid.

The client device 405 includes native applications 550 and/or a browser application 555. The native application implements the collaboration application 414 shown in FIG. 4. The native application 550 communicates with the collaboration platform 410 to enable users to consume, create, share, collaborate on, and/or modify content using the services provided by the collaboration platform 410. The native application 550 also provides the user with the ability to create new workspaces, modify existing workspaces, and to invite other users to collaborate in workspaces. The native application 550 implements the user interfaces shown in FIGS. 1A-3G in such implementations.

The browser application 555 is an application for accessing and viewing web-based content. The web-based content may be provided by the web application 540 of the collaboration platform 410. The web application 540 enables users to consume, create, share, collaborate on, and/or modify content. A user of the client device 405 may access the web application 540 via the browser application 555, and the browser application 555 renders a user interface for interacting with the collaboration platform 410 in the browser application 555. In some implementations, the web application provides user interfaces such as those shown in FIGS. 1A-3G which are presented to the user in the browser application 555.

The collaboration platform 410 supports both the web-enabled native applications 550 and the web application 540 in some implementations, and the users may choose which approach best suits their needs. The collaboration platform 410 provides support for the native application 550, the browser application 555, or both to provide functionality for a user of the client device 405 to obtain the services provided by the collaboration platform 410.

Figure 6A:
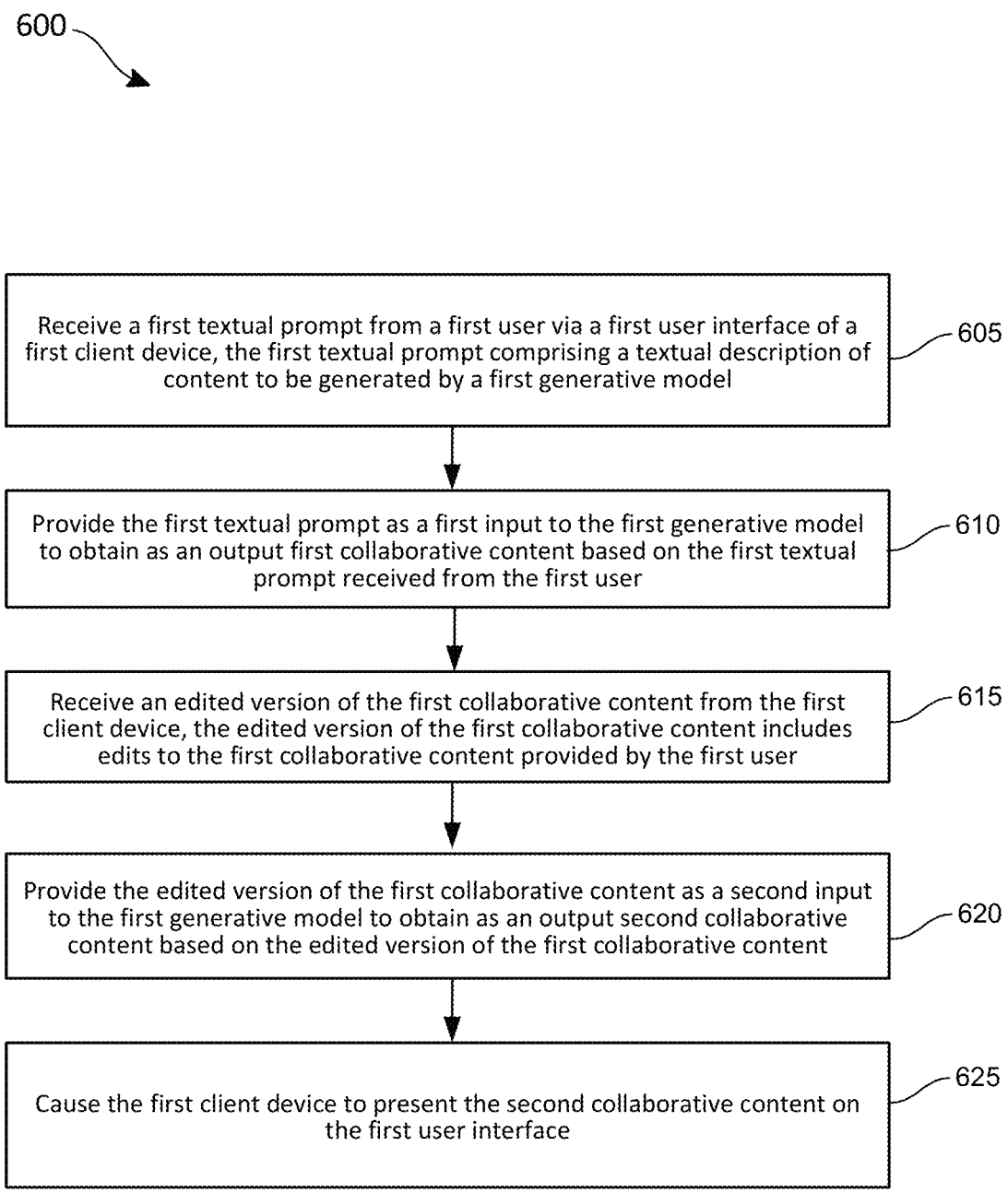
FIG. 6A is a flow chart of an example process for collaborative coauthoring according to the techniques disclosed herein.

FIG. 6A is an example flow chart of an example process 600 for collaborative coauthoring content with an AI. The process 600 can be implemented by the collaboration platform 410 shown in the preceding examples.

The process 600 includes an operation 605 of receiving a first textual prompt from a first user via a first user interface of a first client device 405. The first textual prompt includes a textual description of content to be generated by a first generative model. The first generative model can be implemented by the GPT model 466 shown in FIG. 4. The first textual prompt may be captured using the prompt field 215.

The process 600 includes an operation 610 of providing the first textual prompt as a first input to the first generative model to obtain as an output first collaborative content based on the first textual prompt received from the first user. The first collaborative content may be textual content, which may be formatted textual content as discussed in the preceding examples. In some implementations, the collaborative content may be a diagram, drawing, or other type of content that may or may not include textual elements. The GPT model 466 outputs the collaborative based on the first textual prompt. The collaborative content may be presented to the user in the content pane 240 as shown in the preceding examples.

The process 600 includes an operation 615 of receiving an edited version of the first collaborative content from the first client device, the edited version of the first collaborative content includes edits to the first collaborative content provided by the first user. The user may directly edit the collaborative content to provide guidance to the GPT model 466, and the edited version of the collaborative content is fed back into the GPT model 466 to cause the model to further refine the collaborative content. A technical benefit of this approach is that the user can directly interact with and edit the collaborative content to coauthor the content with the AI, in direct contrast with current approaches to content generation in which the AI-generated content is static and the user refines the textual prompts provided to the model to cause the model to further refine the collaborative content.

The process 600 includes an operation 620 of providing the edited version of the first collaborative content as a second input to the first generative model to obtain as an output second collaborative content based on the edited version of the first collaborative content. The second collaborative content is based on the changes that the user made to the collaborative content and may include both content generated by the AI and content generated by one or more human users. The attribution techniques described herein provide the user and/or collaborators with means for determining whether a particular portion of the content output by the model is human-generated or collaborative content.

The process 600 includes an operation 625 of causing the first client device to present the second collaborative content on the first user interface. As shown in the preceding examples, the revised content provided by the GPT model 466 is presented to the user and/or any collaborators who are currently participating in the authoring session.

Figure 6B:
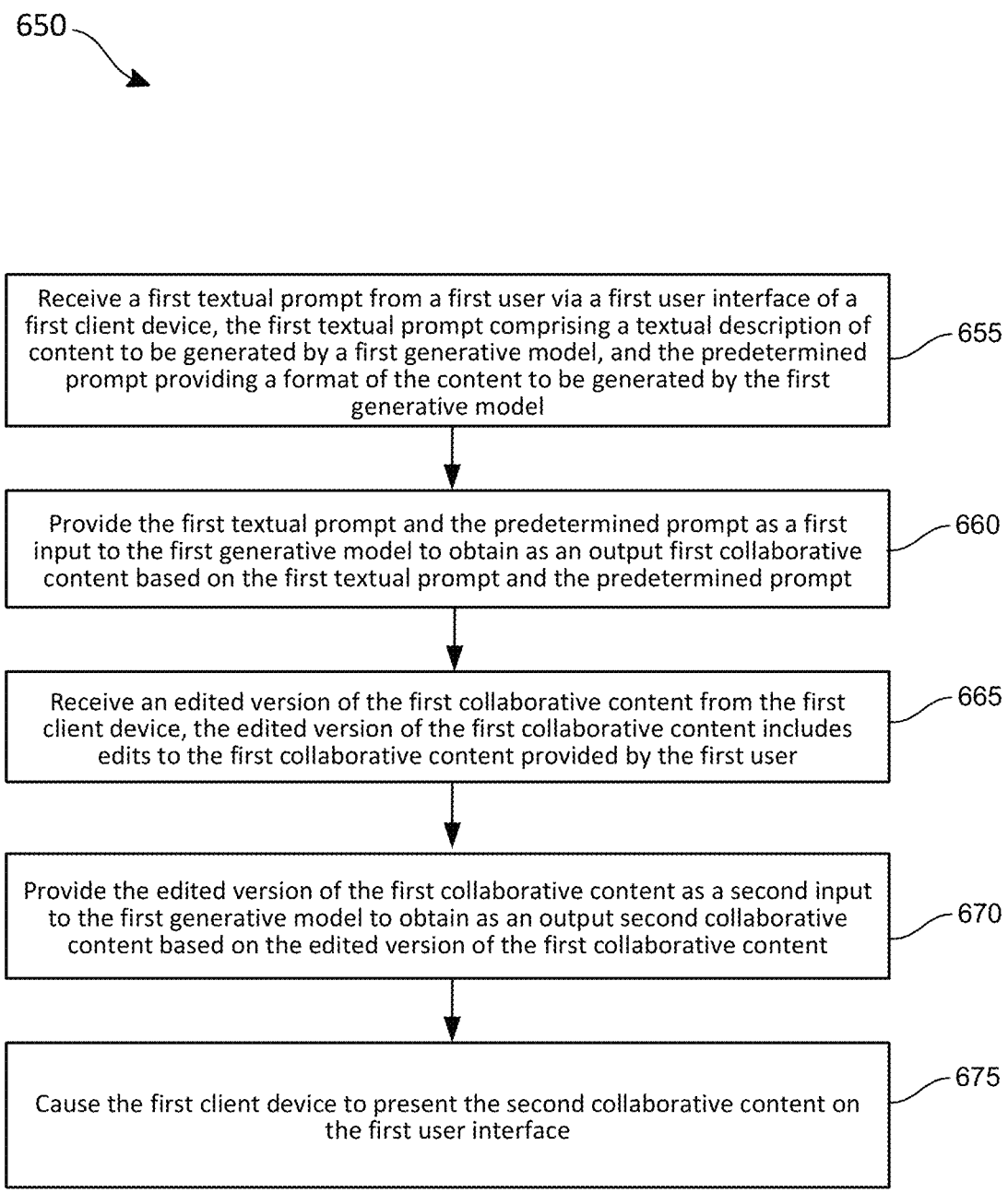
FIG. 6B is a flow chart of another example process for collaborative coauthoring according to the techniques disclosed herein.

FIG. 6B is an example flow chart of an example process 650 for collaborative coauthoring content with an AI. The process 650 can be implemented by the collaboration platform 410 shown in the preceding examples.

The process 650 includes an operation 655 of receiving a first textual prompt from a first user and an indication of a selection of a predetermined prompt from among a plurality of predetermined prompts via a first user interface of a first client device via a first user interface of a first client device 405. The first textual prompt includes a textual description of content to be generated by a first generative model. The first generative model can be implemented by the GPT model 466 shown in FIG. 4. The first textual prompt may be captured using the prompt field 215. The predetermined prompts are presented as the action tiles 210 shown in the preceding examples. In some implementations, the action tiles are associated with a prompt that can be provided input to the first generative model. The prompt includes keywords or phrases that provide context to the generative model in some implementations. This context can include a desired format for the content to be coauthored with the AI.

The process 650 includes an operation 660 of providing the first textual prompt and the predetermined prompt as a first input to the first generative model to obtain as an output first collaborative content based on the first textual prompt and the predetermined prompt. The first collaborative content may be textual content, which may be formatted textual content as discussed in the preceding examples, and this format can be determined based on the predetermined prompt. In some implementations, the collaborative content may be a diagram, drawing, or other type of content that may or may not include textual elements. The GPT model 466 outputs the collaborative based on the first textual prompt. The collaborative content may be presented to the user in the content pane 240 as shown in the preceding examples.

The process 650 includes an operation 665 of receiving an edited version of the first collaborative content from the first client device, the edited version of the first collaborative content includes edits to the first collaborative content provided by the first user. The user may directly edit the collaborative content to provide guidance to the GPT model 466, and the edited version of the collaborative content is fed back into the GPT model 466 to cause the model to further refine the collaborative content. A technical benefit of this approach is that the user can directly interact with and edit the collaborative content to coauthor the content with the AI, in direct contrast with current approaches to content generation in which the AI-generated content is static and the user refines the textual prompts provided to the model to cause the model to further refine the collaborative content.

The process 650 includes an operation 670 of providing the edited version of the first collaborative content as a second input to the first generative model to obtain as an output second collaborative content based on the edited version of the first collaborative content. The second collaborative content is based on the changes that the user made to the collaborative content and may include both content generated by the AI and content generated by one or more human users. The attribution techniques described herein provide the user and/or collaborators with means for determining whether a particular portion of the content output by the model is human-generated or collaborative content.

The process 650 includes an operation 675 of causing the first client device to present the second collaborative content on the first user interface. As shown in the preceding examples, the revised content provided by the GPT model 466 is presented to the user and/or any collaborators who are currently participating in the authoring session.

The detailed examples of systems, devices, and techniques described in connection with FIGS. 1-6B are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-6B are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 7:
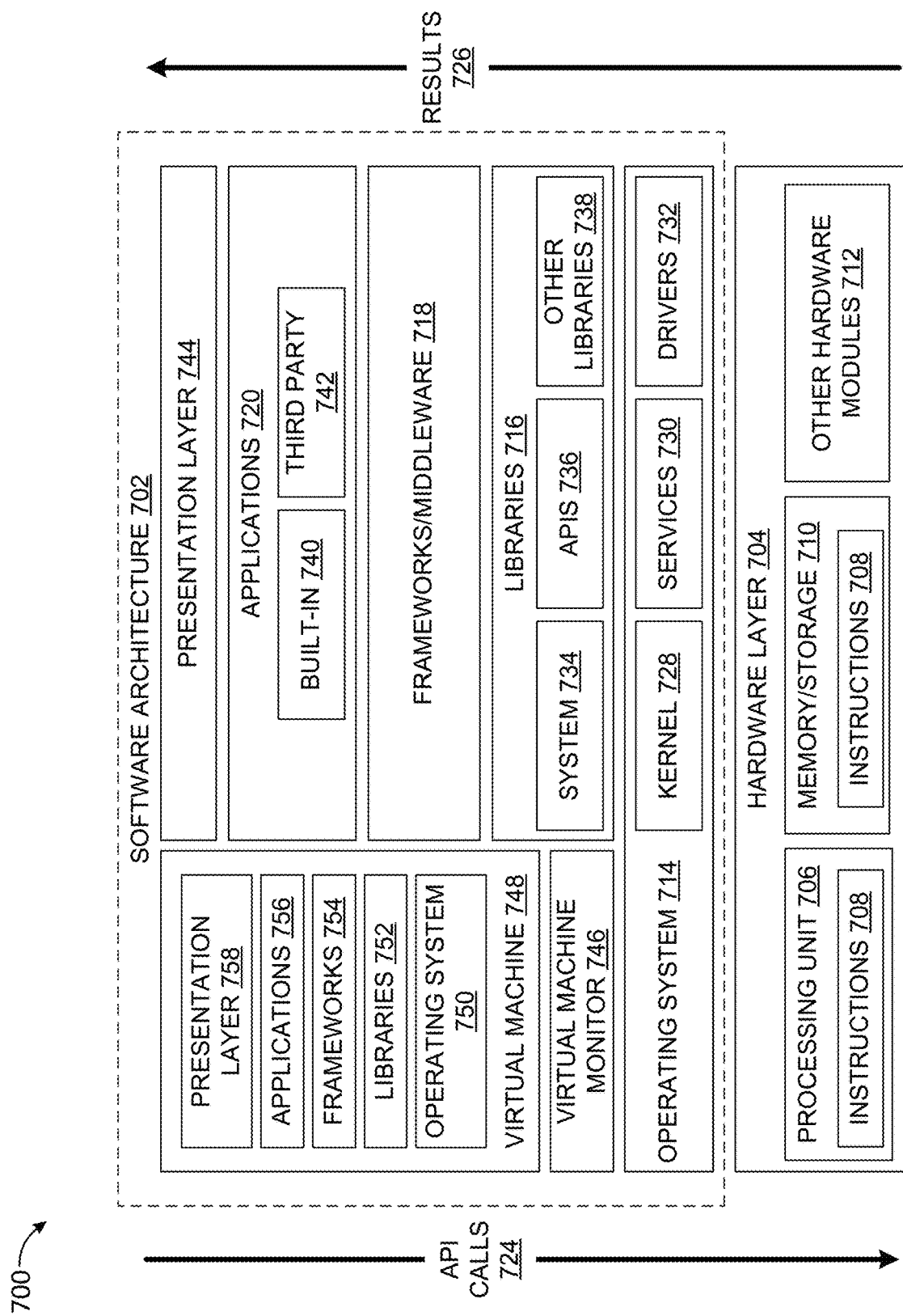
FIG. 7 is a block diagram showing an example software architecture, various portions of which may be used in conjunction with various hardware architectures herein described, which may implement any of the described features.

FIG. 7 is a block diagram 700 illustrating an example software architecture 702, various portions of which may be used in conjunction with various hardware architectures herein described, which may implement any of the above-described features. FIG. 7 is a non-limiting example of a software architecture, and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 and associated executable instructions 708. The executable instructions 708 represent executable instructions of the software architecture 702, including implementation of the methods, modules and so forth described herein. The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular platform. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
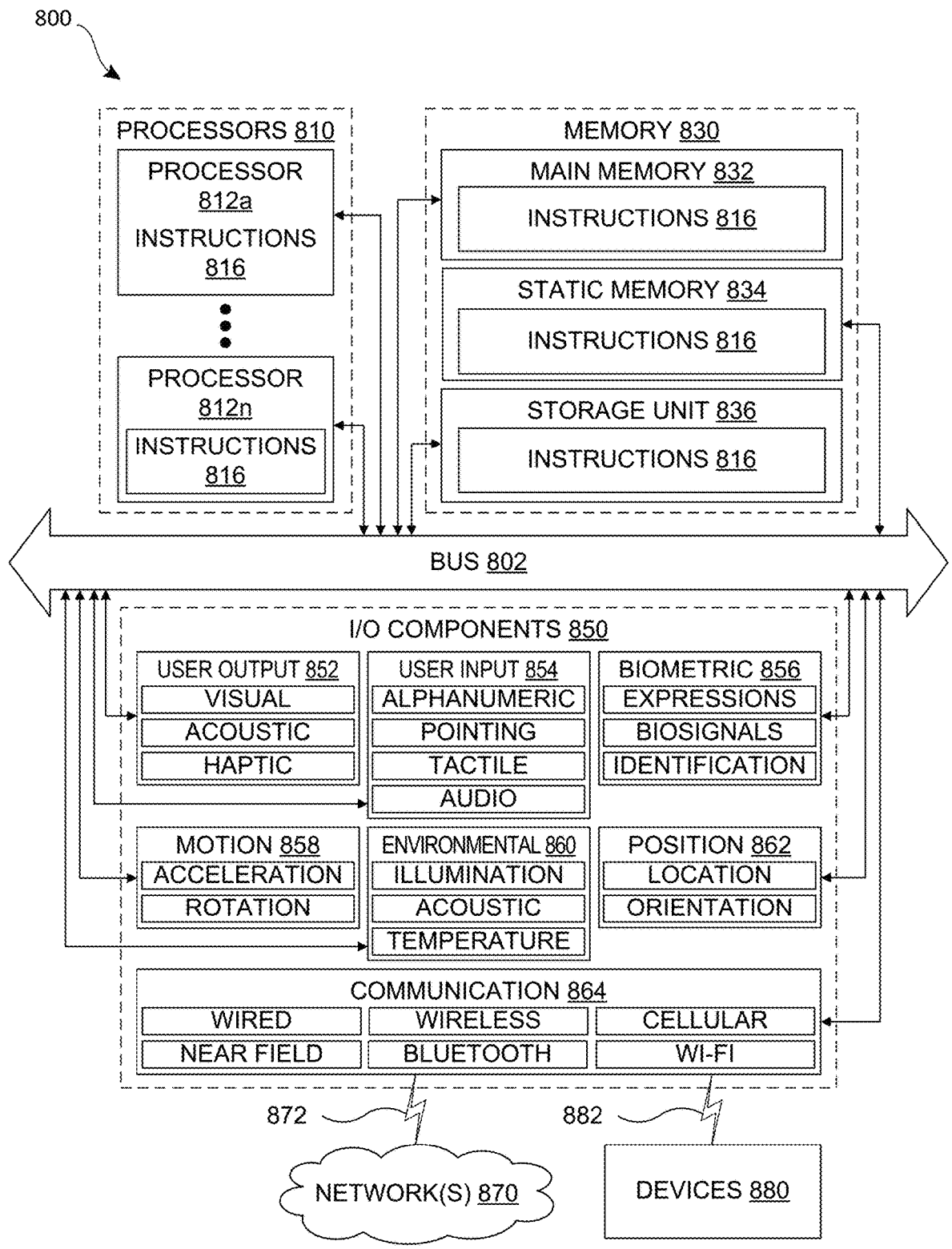
FIG. 8 is a block diagram showing components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement modules or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812$a$ to 812$n$ that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860, and/or position components 862, among a wide array of other physical sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 858 may include, for example, acceleration sensors (for example, an accelerometer) and rotation sensors (for example, a gyroscope). The environmental components 860 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 862 may include, for example, location sensors (for example, a Global Position System (GPS) receiver), altitude sensors (for example, an air pressure sensor from which altitude may be derived), and/or orientation sensors (for example, magnetometers).

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

In the preceding detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element. Furthermore, subsequent limitations referring back to "said element" or "the element" performing certain functions signifies that "said element" or "the element" alone or in combination with additional identical elements in the process, method, article or apparatus are capable of performing all of the recited functions.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a machine-readable medium storing executable instructions that, when executed, cause the processor to perform operations comprising:
receiving, during a coauthoring session between a first user and a first generative model, a first textual prompt from the first user via a user interface of a first client device, the first textual prompt comprising a first textual description;
providing the first textual description as a first input to the first generative model to output a first collaborative content including textual and non-textual collaborative content;
applying on the non-textual collaborative content of the first collaborative content at least one of an image analysis to identify a subject matter depicted therein, or an optical character recognition to extract textual components depicted therein;
monitoring the textual collaborative content and at least one of the subject matter or the textual components for objectionable content;
causing the first client device to present the first collaborative content for editing during the coauthoring session, after determining that the textual collaborative content and the at least one of the subject matter or the textual components do not contain objectionable content;
receiving during the coauthoring session an edited version of the first collaborative content from the first client device, the edited version of the first collaborative content including edits to the first collaborative content provided by the first user via the user interface;
providing the edited version of the first collaborative content as a second input to the first generative model to output a second collaborative content;
causing the first client device to present the second collaborative content on the user interface during the coauthoring session;
maintaining a history of textual prompts, a plurality of collaborative content, and edits to the plurality of collaborative content generated by the first generative model during the coauthoring session, wherein the history includes controls that, when activated, present a view of a state of content generated by the first generative model for each state, the textual prompts include the first textual prompt, and the plurality of collaborative content include the first collaborative content; and
causing the first client device to present the textual prompts and the plurality of collaborative content in a chronological list in conjunction with a current version of the collaborative content in one screen on the user interface during the coauthoring session.

2. The data processing system of claim 1, wherein the non-textual collaborative content of the first collaborative content comprises a diagram, a drawing, an image, a video, or a combination thereof, wherein each user entry is displayed with a user profile icon of a user who authored the user entry in the screen, and
wherein the current version of the collaborative content is displayed with a coauthoring icon on the screen.

3. The data processing system of claim 1, wherein the machine-readable medium includes instructions configured to cause the processor to perform operations of:
receiving a second textual prompt from the first user with the edited version of the first collaborative content;
providing the second textual prompt and the edited version of the first collaborative content as the second input to the first generative model to obtain the second collaborative content based on the edited version of the first collaborative content.

4. The data processing system of claim 1, wherein the machine-readable medium includes instructions configured to cause the processor to perform operations of:
monitoring the first textual prompt, the second textual prompt, and the edited version of the first collaborative content for objectionable content; and
rejecting the first textual prompt, the second textual prompt, or the edited version of the first collaborative content for objectionable content responsive to the first textual prompt, the second textual prompt, or the edited version of the first collaborative content including objectionable content.

5. The data processing system of claim 1, wherein the machine-readable medium includes instructions configured to cause the processor to perform operations of:
monitoring the second collaborative content for objectionable content;
and
discarding the second collaborative content responsive to the second collaborative content including objectionable content.

6. The data processing system of claim 1, wherein the first generative model is a Generative Pre-trained Transformer 3 model or a Generative Pre-trained Transformer 4 model, and wherein the screen presents the chronological list before the current version of the collaborative content.

7. The data processing system of claim 1, wherein the machine-readable medium includes instructions configured to cause the processor to perform operations of:
causing the first client device to present one or more action tiles in another screen on the user interface, wherein the one or more action tiles are to be activated to generate a summary of the collaborative content currently on the screen, to generate a content type other than a current content type of the collaborative content currently on the screen, or a combination thereof.

8. The data processing system of claim 1, wherein the machine-readable medium includes instructions configured to cause the processor to perform operations of:
receiving a third textual prompt from a second client device of a second user;
providing the third textual prompt as a third input to the first generative model to obtain third collaborative content based on the second collaborative content and the third textual prompt;
causing the first client device and the second client device to present the third collaborative content on the user interface.

9. The data processing system of claim 1, wherein the machine-readable medium includes instructions configured to cause the processor to perform operations of:
receiving a third textual prompt from a second client device of a second user;
receiving an edited version of the second collaborative content from the first client device, the edited version of the second collaborative content includes edits to the second collaborative content provided by the second user;
providing the third textual prompt and the edited version of the second collaborative content as a third input to the first generative model to obtain third collaborative content based on the edited version of the second collaborative content and the third textual prompt;
causing the first client device and the second client device to present the third collaborative content on the user interface.

10. The data processing system of claim 1, wherein the machine-readable medium includes instructions configured to cause the processor to perform operations of:
receiving an indication from the first client device to activate an entry in the history; and
causing the first client device to present a version of the collaborative content when a prompt associated with the entry was submitted to the generative model.

11. The data processing system of claim 1, wherein the machine-readable medium includes instructions configured to cause the processor to perform operations of:
receiving an indication from the first client device to split the history into multiple forks;
continuing to revise the textual content generated by the first generative model independently on each fork of the history.

12. The data processing system of claim 1, wherein the second collaborative content includes a plurality of sections, wherein first sections include content authored by the first user and second sections include content authored by the first generative model, and wherein the machine-readable medium includes instructions configured to cause the processor to perform operations of:
associating attribution information with each section of the plurality of sections indicating whether the first user or the first generative model authored the section of the second collaborative content.

13. A method implemented in a data processing system for providing collaborative coauthoring of content, the method comprising:
receiving, during a coauthoring session between a first user and a first generative model, a first textual prompt from the first user via a user interface of a first client device, the first textual prompt comprising a first textual description;
providing the first textual description as a first input to the first generative model to output a first collaborative content including textual and non-textual collaborative content;
applying on the non-textual collaborative content of the first collaborative content at least one of an image analysis to identify a subject matter depicted therein, or an optical character recognition to extract textual components depicted therein;
monitoring the textual collaborative content and at least one of the subject matter or the textual components for objectionable content;
causing the first client device to present the first collaborative content for editing during the coauthoring session, after determining that the textual collaborative content and the at least one of the subject matter or the textual components do not contain objectionable content;
receiving during the coauthoring session an edited version of the first collaborative content from the first client device, the edited version of the first collaborative content including edits to the first collaborative content provided by the first user via the user interface;
providing the edited version of the first collaborative content as a second input to the first generative model to output a second collaborative content;
causing the first client device to present the second collaborative content on the user interface during the coauthoring session;
maintaining a history of textual prompts, a plurality of collaborative content, and edits to the plurality of collaborative content generated by the first generative model during the coauthoring session, wherein the history includes controls that, when activated, present a view of a state of content generated by the first generative model for each state, the textual prompts include the first textual prompt, and the plurality of collaborative content include the first collaborative content; and
causing the first client device to present the textual prompts and the plurality of collaborative content in a chronological list in conjunction with a current version of the collaborative content in one screen on the user interface during the coauthoring session.

14. The method of claim 13, wherein the non-textual collaborative content of the first collaborative content comprises a diagram, a drawing, an image, a video, or a combination thereof.

15. The method of claim 13, further comprising:
receiving a second textual prompt from the first user with the edited version of the first collaborative content;
providing the second textual prompt and the edited version of the first collaborative content as the second input to the first generative model to obtain the second collaborative content based on the edited version of the first collaborative content.

16. The method of claim 13, further comprising:
monitoring the first textual prompt, the second textual prompt, and the edited version of the first collaborative content for objectionable content; and
rejecting the first textual prompt, the second textual prompt, or the edited version of the first collaborative content for objectionable content responsive to the first textual prompt, the second textual prompt, or the edited version of the first collaborative content including objectionable content.

17. The method of claim 13, further comprising:
monitoring the second collaborative content for objectionable content;
and
discarding the second collaborative content responsive to the second collaborative content including objectionable content.

18. The method of claim 13, wherein the first generative model is a Generative Pre-trained Transformer 3 model or a Generative Pre-trained Transformer 4 model.

19. A data processing system comprising:
a processor; and
a machine-readable medium storing executable instructions that, when executed, cause the processor to perform operations comprising:
receiving, during a coauthoring session between a first user and a first generative model, an indication of a selection of a predetermined prompt from among a plurality of predetermined prompts via a user interface of a first client device, the predetermined prompt providing a format of first collaborative content to be generated by a first generative model;
providing the predetermined prompt as a first input to the first generative model to output the first collaborative content, the first collaborative content including textual and non-textual collaborative content;
applying on the non-textual collaborative content of the first collaborative content at least one of an image analysis to identify a subject matter depicted therein, or an optical character recognition to extract textual components depicted therein;
monitoring the textual collaborative content and at least one of the subject matter or the textual components for objectionable content;
causing the first client device to present the first collaborative content for editing during the coauthoring session, after determining that the textual collaborative content and the at least one of the subject matter or the textual components do not contain objectionable content;
receiving during the coauthoring session an edited version of the first collaborative content from the first client device, the edited version of the first collaborative content includes edits to the first collaborative content provided by the first user via the user interface;
providing the edited version of the first collaborative content as a second input to the first generative model to output a second collaborative content based on the edited version of the first collaborative content;
causing the first client device to present the second collaborative content on the user interface during the coauthoring session;
maintaining a history of textual prompts, a plurality of collaborative content, and edits to the plurality of collaborative content generated by the first generative model during the coauthoring session, wherein the history includes controls that, when activated, present a view of a state of content generated by the first generative model for each state, the textual prompts include the predetermined prompt, and the plurality of collaborative content include the first collaborative content; and
causing the first client device to present the textual prompts and the plurality of collaborative content in a chronological list in conjunction with a current version of the collaborative content in one screen on the user interface during the coauthoring session.

20. The data processing system of claim 19, wherein the plurality of predetermined prompts correspond to a plurality of action tiles displayed on the user interface to be activated by a user selection, and wherein the first generative model is a Generative Pre-trained Transformer 3 model or a Generative Pre-trained Transformer 4 model.

* * * * *